United States Patent
Hunter et al.

(10) Patent No.: US 10,841,140 B2
(45) Date of Patent: Nov. 17, 2020

(54) ACTIVE GEO-LOCATION IMPROVEMENTS FOR ORTHOGONAL FREQUENCY DIVISION MULTIPLEX WIRELESS LOCAL AREA NETWORK DEVICES

(71) Applicant: SR Technologies, Inc., Sunrise, FL (US)

(72) Inventors: Christopher Hunter, Houston, TX (US); Patrick Murphy, Polson, MT (US)

(73) Assignee: SR Technologies, Inc., Sunrise, FL (US)

( * ) Notice: Subject to any disclaimer, the term of this patent is extended or adjusted under 35 U.S.C. 154(b) by 0 days.

(21) Appl. No.: 16/708,923

(22) Filed: Dec. 10, 2019

(65) Prior Publication Data

US 2020/0220754 A1 Jul. 9, 2020

Related U.S. Application Data

(60) Provisional application No. 62/789,204, filed on Jan. 7, 2019.

(51) Int. Cl.
*H04B 17/23* (2015.01)
*H04L 27/26* (2006.01)
*H04W 74/08* (2009.01)
*H04W 84/12* (2009.01)

(52) U.S. Cl.
CPC ..... *H04L 27/2601* (2013.01); *H04W 74/0816* (2013.01); *H04B 17/23* (2015.01); *H04W 84/12* (2013.01)

(58) Field of Classification Search
USPC .......................................................... 370/312
See application file for complete search history.

(56) References Cited

U.S. PATENT DOCUMENTS

| | | | |
|---|---|---|---|
| 10,598,762 B1* | 3/2020 | Giallorenzi | G01S 5/0226 |
| 2008/0170530 A1* | 7/2008 | Connors | H04H 20/67 370/312 |
| 2017/0099576 A1* | 4/2017 | El-Sallabi | H04B 7/0456 |
| 2020/0112598 A1* | 4/2020 | Petry | H04L 65/601 |

\* cited by examiner

*Primary Examiner* — Eva Y Puente
(74) *Attorney, Agent, or Firm* — Christopher & Weisberg, P.A.

(57) ABSTRACT

A method and wireless device are disclosed that increase the range of active geo-location from the measuring station as compared with known solutions by increasing the effective receive sensitivity of the measuring station by transmitting a predetermined ranging packet and correlating the raw received bit stream of the response packet with one or more predetermined bit streams. In one embodiment, the disclosed method and system may be applied to the reception of IEEE 802.11 orthogonal frequency division multiplexed (OFDM) acknowledgments (ACK) and clear-to-send (CTS) packets in response to OFDM data null and OFDM request-to-send (RTS) packets respectively, in the 2.4 GHz and 5 GHz bands.

20 Claims, 16 Drawing Sheets

ACTIVE GEO-LOCATION IMPROVEMENTS FOR ORTHOGONAL FREQUENCY DIVISION MULTIPLEX WIRELESS LOCAL AREA NETWORK DEVICES

CROSS-REFERENCE TO RELATED APPLICATIONS

This application claims priority to and is related to U. S. Provisional Application No. 62/789,204, filed Jan. 7, 2019, entitled "ACTIVE GEO-LOCATION IMPROVEMENTS FOR OFDM WLAN DEVICES," the entirety of which is incorporated herein by reference.

TECHNICAL FIELD

The present disclosure relates to wireless devices such as wireless local area network (WLAN) devices, and in particular to the geo-location of WLAN devices.

BACKGROUND

Initially, it is noted that IEEE Standard 802.11-2016 is used as the base reference for disclosures used herein, the entire contents of which are incorporated herein by reference. The IEEE 802.11-2016 Standard is commonly referred to as "Wi-Fi" and is referred to as such herein.

The location of wireless devices can be determined by various methods. These methods may be classified as active, passive and combined active and passive. In an active location scheme, a device that is determining the location or range, the measuring device, transmits certain packets to the device being located, i.e., the target device, and a common location method includes measuring the time of arrival (TOA) of the response packet from the target device and compare that to the time of departure (TOD) of the request packet that was transmitted by the measuring device so as to determine the round trip time, RTT.

In such location systems, it is common to use multiple measuring devices to determine the wireless device location. In such systems, simultaneous TOA and/or TOD measurements are taken by different measuring devices situated at different points, and the location of the target device is calculated from these simultaneous measurements.

In an active location scheme, the TOD may be measured for a packet that is transmitted from the measuring station addressed to the target station. The TOA of the response from the target station at the measuring station is then also measured. If the turnaround time for the target station to receive the packet from the measuring station and to start to transmit the response is known, then the time difference at the measuring station between the TOA and the TOD, minus the turnaround time at the target station will be directly proportional to twice the distance of the target station from the measuring station. For example, if the target station is a wireless device based upon IEEE 802.11 technology, and if the packet transmitted from the measuring station to the target station is a data packet, or a data null packet, the response from the target station will normally be an acknowledgement (ACK) packet. If the packet transmitted from the measuring station to the target station is a control packet, for example a request-to-send (RTS) packet, then the response from the target station will normally be a clear-to-send (CTS) packet. In these two examples, the turnaround time at the target station is defined in the IEEE 802.11 standard as the short interframe spacing (SIFS), which is a preset value. Hence, the time delay, td, between the measuring station and the target station, may be determined from the calculation td=(TOA−TOD−SIFS)/2 and the distance between the measuring station and the target station is then td*c, where c is the speed of light. This method of estimating the distance to a target station by measuring the TOD and TOA and accounting for the turnaround time is known.

FIG. 1 is a diagram of a typical location system 100 which includes three measuring stations 10a, 10b and 10c (referred to collectively herein as "measuring stations" or "measuring receivers" 10). The target station 120 may be a wireless device, such as, for example, an Access Point (AP) that is to be located by the three measuring stations 10. The distance of the target station 120 from measuring station 10a is D1, 130. The distance of the target station 120 from measuring station 10b is D2, 140. The distance of the target station 120 from measuring station 10c is D3, 150. The round trip time, RTT1, determined from the calculation RTT=(TOA−TOD−SIFS), is measured for transmissions from measuring station 10a and this can used to calculate the distance D1 130 using the formula D1=RTT1*c/2 where c is the speed of light. Similarly, RTT2 and RTT3 measurements result in the determination of distances D2 140 and D3 150. The methods for calculating the location of target station 120 using the distances D1 130, D2 140 and D3 150 are well known.

FIG. 2 is a diagram of an airborne measuring station 10 actively geo-locating target stations 120a, 120b, 120c and 120d. The target station 120a depicts the example of an outdoor device, target station 120b depicts the example of a device inside a residential home, target station 120c depicts the example of a device inside an automobile, and target station 120d depicts the example of a device inside an apartment. The obstruction losses for each of the target stations 120a, 120b, 120c and 120d will differ and hence the maximum range at which the measuring station 110 can successfully geo-locate the target stations will differ because the radio frequency (RF) obstruction losses will vary between the target stations. From the airborne measuring station's 10 perspective, the range will be dependent upon two factors: the transmit power of the transmitted ranging packet, which should be such that the target station will successfully receive it, and the receive sensitivity of the airborne measuring station 10, which would be such that the response packet is received successfully at the airborne measuring station 10. Transmitting the ranging packet at a sufficiently high power is straightforward, e.g., higher power amplifier and/or higher gain antenna, but the receive sensitivity of the measuring station 110 is generally restricted to the noise figure of the receiver.

The signal level, Pr, received at the measuring station 110 is:

$$Pr = Pt + G_1 + G_2 - L_{fs} - Lo \quad (1)$$

Where
Pt=Transmit power from the target station 120, i.e., wireless device
$G_1$=Antenna gain at the airborne measuring station
$G_2$=Antenna gain at the target station
$L_{fs}$=Propagation loss, free space
Lo=Obstruction loss The obstruction loss, Lo, for the path from the target station 120a and the airborne measuring station 10 can be assumed to be zero as the target station 120a has a line-of-sight path to the airborne measuring station 10. In contrast, the obstruction losses for the other target stations may be on the order of 10 dB for target station 120b, 6 dB for target station 120c and 15-20 dB for target station 120d. The range of the airborne measuring station 10 to successfully detect the response packets from each of these target stations is limited due to the fixed sensitivity of the measuring receiver 10 which is restricted by the noise figure of the receiver and the need to receive a packet without errors.

SUMMARY

Some embodiments include methods and wireless devices for the geo-location of other wireless devices.

According to one aspect, a method in a first wireless device (WD) includes transmitting a ranging signal and recording a time of transmitting the ranging signal. The method also includes receiving an orthogonal frequency division multiplexing (OFDM) response signal transmitted from a second WD in response to the ranging signal. The method further includes determining an expected bit sequence for a coded and scrambled OFDM response signal for each of a plurality of scrambler seeds. The method includes detecting the presence of an OFDM waveform in a sequence of received samples of the received OFDM response signal. The method also includes cross-correlating the received samples with a local copy of a preamble waveform and searching for a known periodicity of the preamble waveform. The method also includes demodulating coded bits in the OFDM response signal. Then, according to one method bits of the sequence of received samples of the received OFDM response signal are correlated with bits of expected sequences to determine a correlation value for each of the plurality of scrambler seeds to produce a plurality of correlation values, each correlation value being indicative of an extent to which a sequence of received samples matches an expected sequence. The method also includes determining a maximum correlation value of the plurality of correlation values. The method also includes comparing the maximum correlation value to a predetermined threshold, T. When the maximum correlation value exceeds the threshold, T, then, the method includes the further steps of recording a time of reception of the received OFDM response signal, and determining a geo-location of the second WD based at least in part on the time of transmission of the ranging signal and the time of reception of the OFDM response signal.

According to this aspect, in some embodiments, the transmitted ranging signal is one of a request-to-send (RTS) signal and a data null signal. In some embodiments, the method further comprises using a branched preamble detector using multiple cross correlators in parallel branches, each cross correlator tuned to a different carrier frequency offset (CFO) to produce the plurality of correlation values, each CFO being within a range of offsets permitted by an IEEE 802.11 Standard, determining the branch that produces a largest correlation, and estimating the CFO based upon the branch that produces the largest correlation. In some embodiments, the method further includes determining parameters of the ranging signal by at least one of: selecting a WD receiver address (RA) to be used as a medium access control (MAC) address of the second WD; selecting a MAC address to be used as a wireless transmitter address, TA; and selecting a duration value. In some embodiments, a determination of the bits of the expected sequence includes: constructing 24 bits of the signal field, the signal field including rate, length and parity; constructing 16 bits of a service field; constructing frame control, duration and RA fields; calculating a 32 bit frame check sequence (FCS) field; constructing the payload by appending the FCS field to the frame control, duration and RA field. Then, for each of the plurality of scrambler seeds: the service and payload fields are scrambled using the scrambler seed; the signal field is appended to the scrambled service and payload fields to form a 152 bit sequence; and the signal field and the scrambled service and payload fields are encoded to form a 304 bit sequence. In some embodiments, the threshold, T, depends at least in part on a bit error probability, Pb, the bit error probability, Pb, being based on a signal to noise ratio (SNR). In some embodiments, the threshold, T, in percent is given by T=100 (1-2 Pb). In some embodiments, the method further includes receiving a subsequent spread spectrum signal when the threshold, T, is not exceeded for a predetermined time.

According to another aspect, a first WD includes: a transceiver configured to transmit a ranging signal and record a time of transmitting the ranging signal and receive an orthogonal frequency division multiplexing (OFDM) response signal transmitted from a second WD in response to the ranging signal. The first WD also includes processing circuitry in communication with the transceiver in which the processing circuitry is configured to determine an expected bit sequence for a coded and scrambled OFDM response signal for each of a plurality of scrambler seeds and detect the presence of an OFDM waveform in a sequence of received samples of the received OFDM response signal. The processing circuitry is also configured to cross-correlate the received samples with a local copy of a preamble waveform and searching for a known periodicity of the preamble waveform and demodulate coded bits in the OFDM response signal. The processing circuitry is further configured to correlate bits of the sequence of received samples of the received OFDM response signal with bits of expected sequences to determine a correlation value for each of the plurality of scrambler seeds to produce a plurality of correlation values, each correlation value being indicative of an extent to which a sequence of received samples matches an expected sequence. The processing circuitry is further configured to determine a maximum correlation value of the plurality of correlation values and compare the maximum correlation value to a predetermined threshold, T. When the maximum correlation value exceeds the threshold, T, then the processor is further configured to record a time of reception of the received OFDM response signal, and determine a geo-location of the second WD based at least in part on the time of transmission of the ranging signal and the time of reception of the OFDM response signal.

According to this aspect, in some embodiments, the transmitted ranging signal is one of a request-to-send (RTS) signal and a data null signal. In some embodiments, the processing circuitry further includes a branched preamble detector using multiple cross correlators in parallel branches, each cross correlator tuned to a different carrier frequency offset (CFO) to produce the plurality of correlation values, each CFO being within a range of offsets permitted by the IEEE 802.11 Standard. In some embodiments, the processing circuitry is further configured to determine the branch that produces a largest correlation, and estimate the CFO based upon the branch that produces the largest correlation. In some embodiments, the processing circuitry is further configured to determine parameters of the ranging signal by at least one of: selecting a WD receiver address (RA) to be used as a medium access control (MAC) address of the second WD; selecting a MAC address to be used as a wireless transmitter address, TA; and selecting a duration value. In some embodiments, determination of the bits of the expected sequence includes: constructing 24 bits of the signal field, the signal field including rate, length and parity, constructing 16 bits of a service field, constructing frame control, duration and RA fields, calculating a 32 bit frame check sequence, FCS, field, and constructing the payload by appending the FCS field to the frame control, duration and RA fields. Then, for each of the plurality of scrambler seeds, the determination of the bits of the expected sequence further includes scrambling the service and payload fields using the scrambler seed, appending the signal field to the scrambled service and payload fields to form a 152 bit sequence, and encoding the signal field and the scrambled service and payload fields to form a 304 bit sequence. In some embodiments, the threshold, T, depends at least in part on a bit error probability, Pb, the bit error probability, Pb, being based on a signal to noise ratio (SNR). In some embodiments, the threshold, T, in percent is given by T=100 (1-2 Pb). In some embodiments, the transceiver is further configured to receive subsequent spread spectrum signal when the threshold, T, is not exceeded for a predetermined time.

According to yet another aspect, a first WD for determining a geo-location of a second WD is provided. The first WD includes a transceiver configured to transmit a ranging signal and record a time of transmitting the ranging signal and receive an orthogonal frequency division multiplexing (OFDM) response signal transmitted from a second WD in response to the ranging signal and record a time of reception of the received OFDM response signal. The first WD further includes processing circuitry in communication with the transceiver in which the processing circuitry is configured to determine an expected sequence for a coded and scrambled OFDM response signal for each of a plurality of possible scrambler seeds, one of which scrambles the signal field, to produce a plurality of expected sequences. The processing circuitry is further configured to detect the presence of an OFDM waveform in a sequence of received samples of the received OFDM response signal, cross-correlate the received samples with a local copy of a preamble waveform and search for a known periodicity of the preamble waveform and demodulate the coded bits in the OFDM response signal. The processing circuitry is further configured to correlate a received sequence of samples of the received OFDM response signal with the expected sequences to determine a correlation value for each of the plurality of scrambler seeds to produce a plurality of correlation values. The processing circuitry is further configured to determine a maximum correlation value among the plurality of correlation values and compare the maximum correlation value to a predetermined threshold, T. When the maximum correlation value exceeds the threshold, T, then the processing circuitry if further configured to determine a geo-location of the second WD based at least in part on the time of transmission of the ranging signal and the time of reception of the OFDM response signal.

According to this aspect, in some embodiments, the threshold, T, depends at least in part on a bit error probability, Pb. In some embodiments, the bit error probability, Pb, is based on a signal to noise ratio (SNR). In some embodiments, the processing circuitry is further configured to receive a subsequent spread spectrum signal when the threshold, T, is not exceeded for a predetermined time.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

As an initial matter, it is noted that improving the effective sensitivity of the measuring receiver as compared with known arrangements will increase the range at which target stations 120 may be detected and located. The present disclosure provides methods and devices that increase the range of active geo-location from a measuring station, such as an airborne measuring station, by increasing the effective receive sensitivity of the measuring station by the detection of 802.11 OFDM waveforms received at negative signal to noise SNR levels. In some embodiments, the disclosed method applies to the reception of orthogonal frequency division multiplexing OFDM acknowledgement (ACK) and clear-to-send (CTS) packets in response to data or data null packets and request-to-send (RTS) packets respectively, in the 2.4 and 5.2 GHz bands. In one embodiment of the present disclosure, a single measuring station is used. However, it is understood that multiple measuring stations can also be used. Further, it is noted that the measuring station may be airborne or ground-based. Discussions herein regarding airborne measuring stations are equally applicable to ground-based embodiments.

Figure 1:
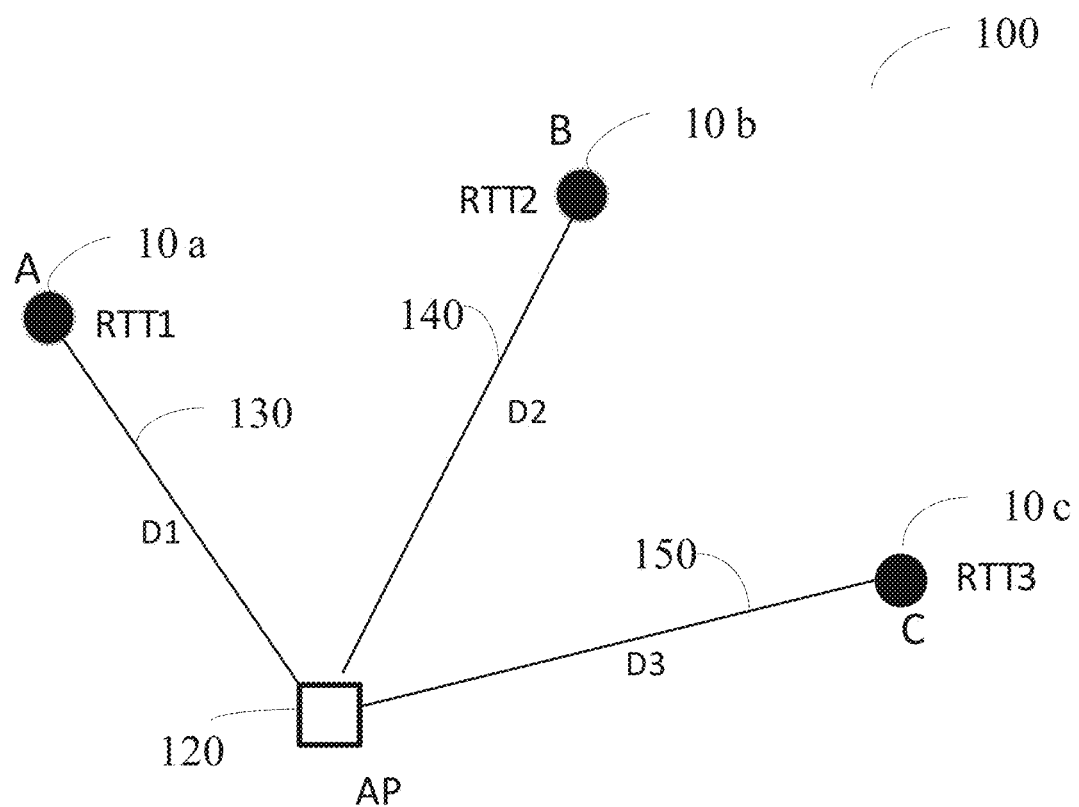
FIG. 1 is a diagram of a typical location system which includes three measuring stations.
Figure 2:
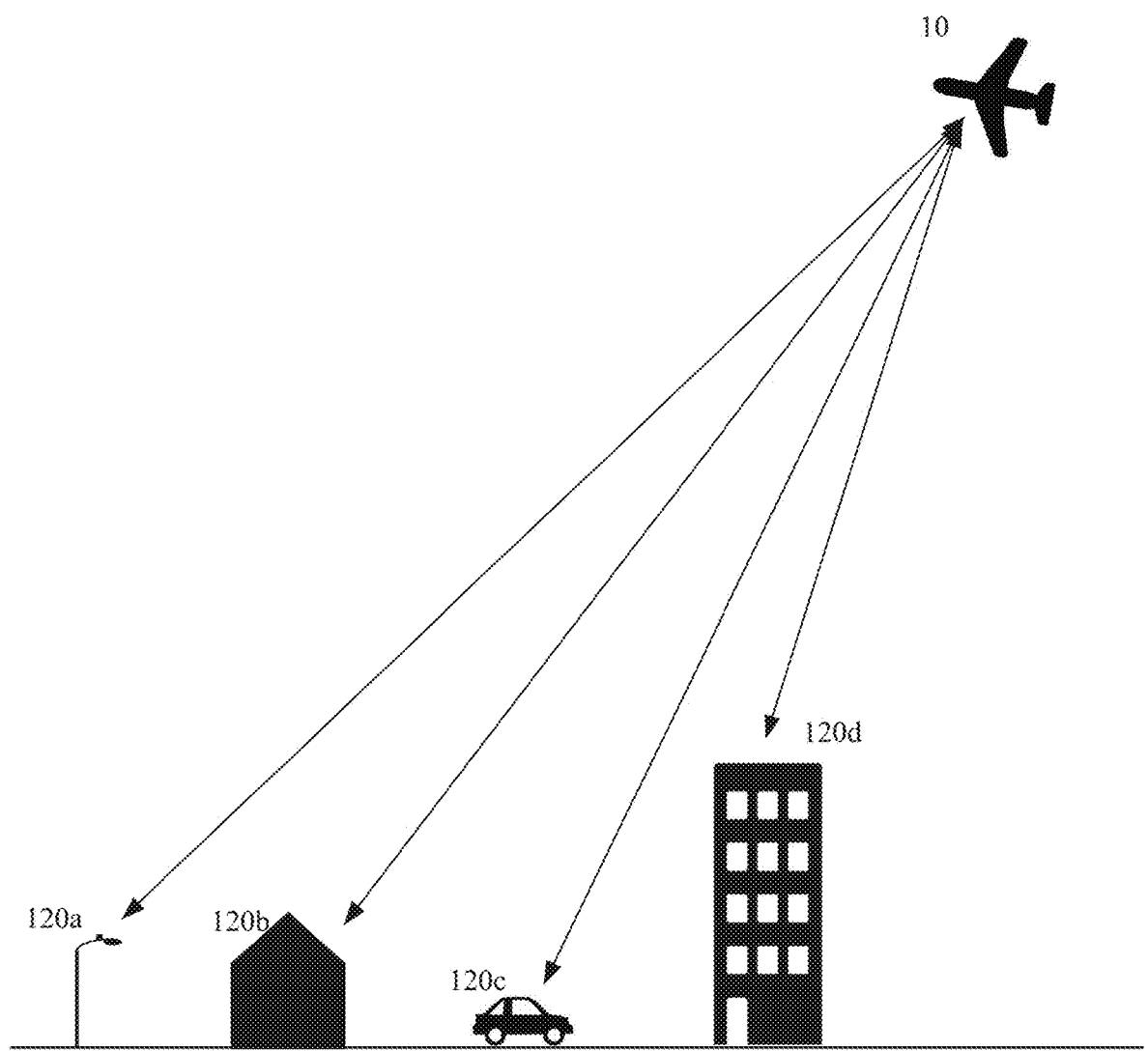
FIG. 2 is a timing diagram that describes the ranging method of the present disclosure that may be used to determine the distance between two wireless devices.
Figure 3:
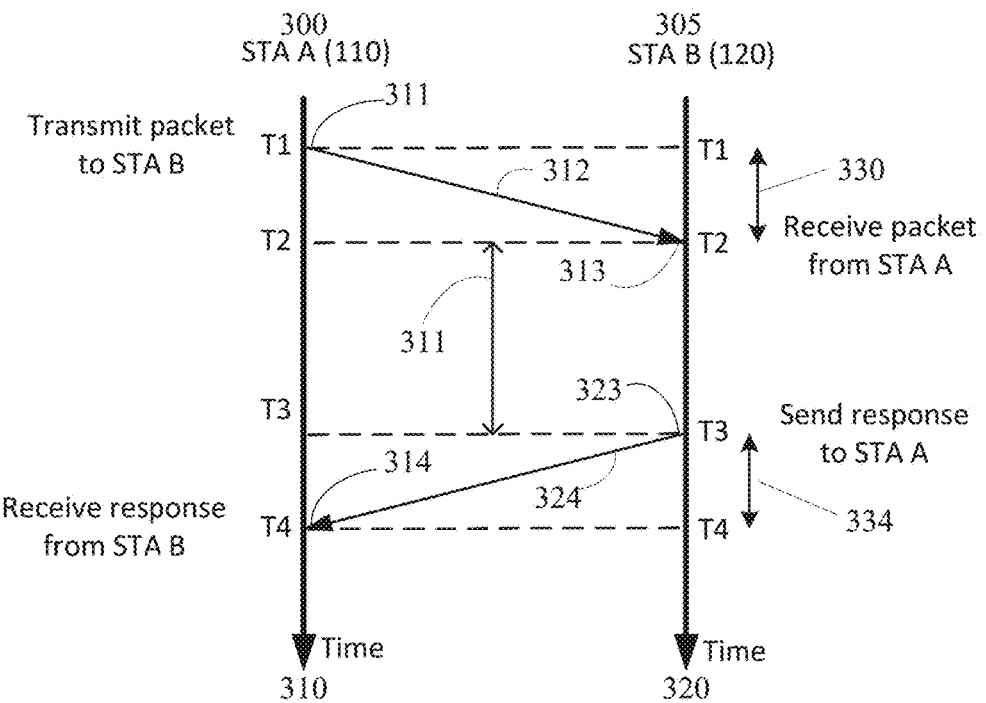
FIG. 3 is a timing diagram that describes in further detail the ranging transmission method.

Referring again to the drawing figures, there is shown in FIG. 3 a timing diagram that describes an example ranging method of the present disclosure that may be used to determine the distance between two wireless devices, for example wireless device STA A 300 and wireless device STA B 305. In one embodiment, one of the wireless devices, e.g., STA B 305, may be target station 120. In another embodiment, at least one of wireless devices (i.e., at least one of STA A 300 and STA B 305) is a measuring station such as measuring station 110. Time axis 310 refers to the time axis for STA A 300 and time axis 320 refers to the time axis for STA B 305. At time T1 311, STA A 300 transmits a packet 312 to STA B 305. This transmission packet 312 is received at STA B 305 at time T2 313. The propagation time of the transmission packet 312 is thus (T2−T1) 330. STA B 305 transmits a response packet 324 at time T3 323. The time 311 that has elapsed between the reception of the packet at time T2 313 and the transmission at time T3 323 is the turnaround time 311 at STA B 305. The turnaround time 311 at STAB, as specified in IEEE 802.11-2016, will be equal in duration to SIFS. At time T4 314, STA A 300 receives the response 324 from STA B 305. The propagation time of the transmission packet 324 is (T4−T3) 334. It should be noted that the time differences 330 (T2−T1) and 334 (T4−T3) represent the propagation time, td, of the transmissions and should be equal assuming the distance between the two stations has not changed. The total time that elapses between the transmission packet 312 and the response packet 324 at STA A 300 is $$(T2-T1)+(T3-T2)+(T4-T3)=(T4-T1)=td+SIFS+td$$

Hence, $td=(T4-T1-SIFS)/2$ (2)

Expression (2) is a simplified equation that is provided to explain the general idea of the ranging transmission method. Note that the duration of the transmitted packet and the response packet is not accounted for in equation (2). Note, however, that in practice it is common that the timestamp of a packet is set to coincide with the end of the packet at the point where the frame check is completed.

Figure 4:
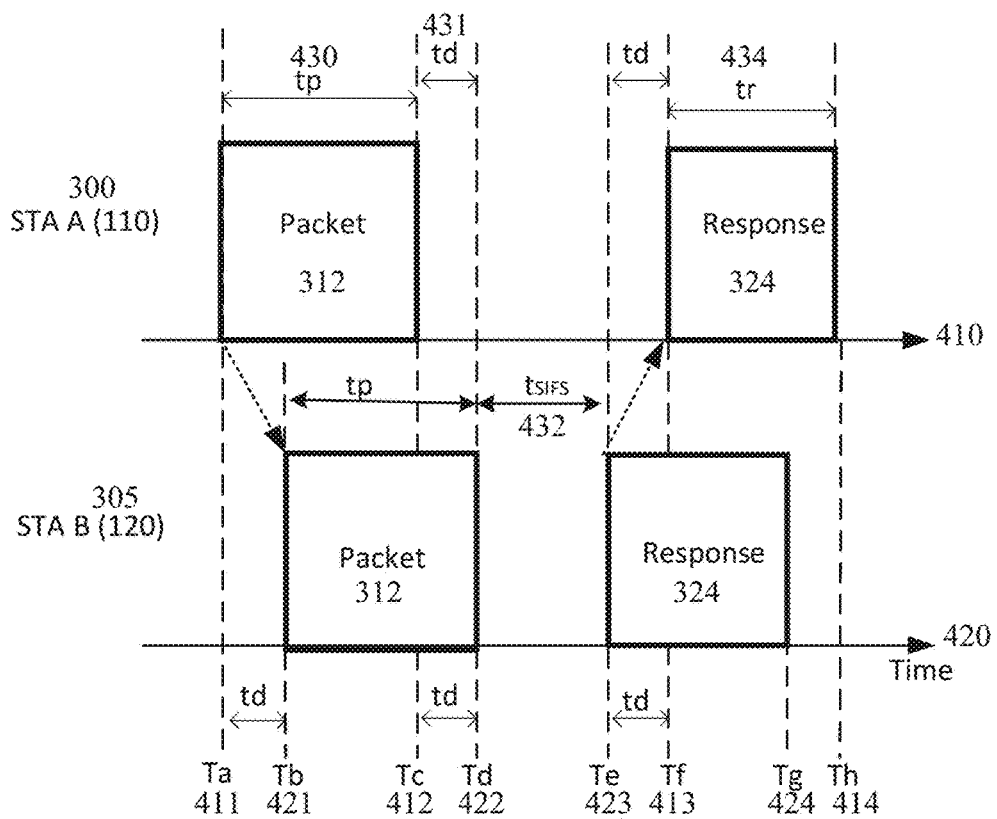
FIG. 4 is a diagram of an airborne measuring station actively geo-locating target stations.

FIG. 4 is a timing diagram that describes in further detail the example ranging transmission method. Time axis 410 is the time axis for STA A 300 and time axis 420 is the time axis for STA B 305. At time Ta 411, STA A 300 starts the transmission of packet 312 which is addressed to STA B 305. After a time delay of td, at time Tb 421, STA B 305 starts to receive packet 312. At time Tc 412, STA A 300 completes the transmission of packet 312 and at time Td 422, STA B 305 completes the reception of packet 312. The time difference between Tc 412 and Td 422 is td 431, the propagation time for the packet to travel from STA A 300 to STA B 305. Note that the time differences (Tc−Ta) and (Td−Tb) are both the duration tp 430 of the transmitted packet 312.

STA B 305 transmits the response packet 324 at time Te 423. Assuming that the response is an ACK or an RTS packet in reply to the received packet 312, time Te 423 ideally will be at a time $t_{SIFS}$ 432 after time td 422, where $t_{SIFS}$ 432 is the SIFS time as defined in the IEEE 802.11-2016 standard. At time Tf 413, STA A 300 starts to receive the response 324. At time Tg 424, STA B 305 completes the transmission of the response 324 and at time Th 414, STA A 300 completes receiving the response 324. Note that the time differences (Tb−Ta), (Td−Tc), (Tf−Te) and (Th−Tg) are all equal and have the value td 431 which is the propagation time for the packet and response to travel between the two STAs.

At STA A 300, the time of a packet at the point when the frame check has completed, may be recorded. Hence, assuming that STA A 300 is the measuring station, the time for the transmission of packet 312 that is recorded is Tc 412, and the time that is recorded for the reception of the response 324 is Th 414. In order to calculate the value of td, it is necessary to know the duration tr 434 of the response 324. Calculating the duration tr 434 is straightforward as the measuring station STA A 300 can monitor the details of the response packet such as data rate and length. In practice therefore, STA A 300 can calculate the value of td from expression (3):

$$td=(Th-Td-tr-t_{SIFS})/2 \quad (3)$$

and hence the corresponding distance, $D=td*c$ (4)

Stated another way, STA A 300 begins transmission of ranging packet 312 at a beginning transmission time Ta 411 and ends transmission of the ranging packet 312 at an ending transmission time Tc 412. STA B 305 begins receiving of the first ranging packet 312 at a beginning reception time Tb 421 and receives the complete first ranging packet 312 at an ending reception time Td 422, wherein d is measured as the time between the ending transmission time Tc 412 and the ending reception time Td 422.

In cases where there is a single measuring station 110, as may be the case when the station is airborne, then the three measuring distances D1 130, D2 140 and D3 150 may be taken at different points in time. In this case, the measuring station 110 may be flying over an area and periodically transmitting the packets 312, receiving the response packets 324 and calculating the delay time td. Over time the location of AP 120 can be calculated with increasing accuracy as more measurements are taken by the measuring station 110 from varying positions. Such calculations are well known in the art.

As mentioned previously, the packet exchange may be any pair of packets where an automatic response packet is sent. Commonly used packets in Wi-Fi include an RTS/CTS exchange and a Data (null)/Ack exchange.

OFDM waveforms, used in Wi-Fi, use coherent receive processing with the following example steps:
1. Detecting the presence of an OFDM waveform in a received sample stream.
2. Establishing OFDM symbol boundaries for channel estimation, carrier frequency offset (CFO) estimation, and Fast Fourier transform FFT operations.
3. Equalization of received symbols to correct channel and frequency offset effects.
4. Demodulation and decoding of physical layer PHY header and medium access controller MAC payload symbols.
5. De-scrambling MAC payload using scrambler seed extracted from decoded bits.

In some embodiments, the OFDM waveform preamble is defined in the IEEE Standard as a 320-sample sequence composed of a Short Training Field and Long Training Field, each 160 samples long. The Short Training Field (STF) is typically used by receivers for initial packet detection, automatic gain control (AGC) convergence, and coarse synchronization. The Long Training Field (LTF) is typically used by receivers to refine synchronization and to estimate the channel frequency response. The LTF waveform was designed to have good autocorrelation properties with reasonable peak-to-average power.

Examples of two correlation schemes that may be utilized to detect OFDM waveforms include cross correlation and autocorrelation. Cross correlation compares received samples to a local copy of the preamble waveform searching for a match. Autocorrelation compares recently-received samples to previously-received samples searching for the preamble's known periodicity. Cross correlation has an advantage of only considering one vector of noisy samples, computing the correlation metric by multiplying this vector by a noiseless copy of the transmitted waveform. However cross correlation suffers in the presence of realistic wireless degradations including carrier frequency offset CFO and multipath fading. Autocorrelation is robust to CFO and multipath fading as each copy of a training symbol is subjected to identical degradations, thereby preserving the waveform's underlying periodicity. However, autocorrelation suffers from the extra noise admitted by computing a correlation metric using two vectors of received samples.

Basically, in order to provide the best receive sensitivity, cross correlation provides the better performance than autocorrelation but the performance will degrade significantly in the presence of CFO. The IEEE 802.11 Standard requires transmit center frequency accuracy of ±20 ppm.

Decoding the OFDM payload is further complicated by scrambling. According to the IEEE 802.11 Standard, a pseudo-random 7-bit scrambling seed is used for each 802.11 OFDM packet. The OFDM receiver recovers this seed from the scrambled "service" field in the first OFDM symbol following the "signal" field. However, if a bit error occurs in the decoded service field, the descrambled payload will be totally in error. The probability of a bit error in the service field becomes higher as the SNR decreases. Hence, if attempting to detect an OFDM CTS or ACK packet at low or negative SNR levels, there is a high probability that one or more bits in the service field may be in error and the scrambler seed may not be recoverable.

As discussed above, a preamble detector using cross correlation provides the better SNR sensitivity or receive signal sensitivity, but the sensitivity degrades with CFO. Herein a brute force solution to the CFO problem is disclosed that includes a branched preamble detector using multiple parallel cross correlators, "branches", each tuned to a different CFO within the range of offsets permitted by the IEEE 802.11 Standard.

Figure 5:
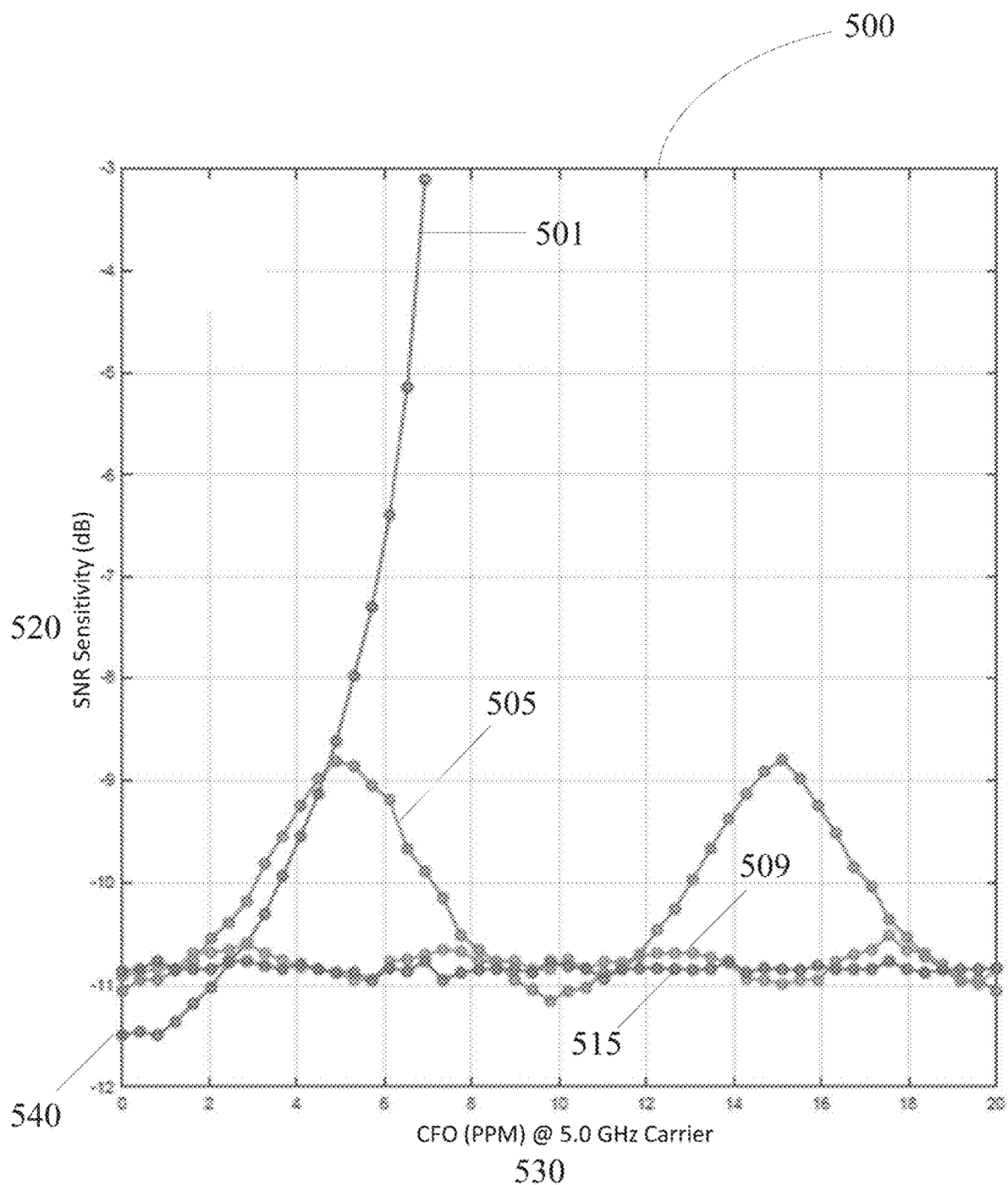
FIG. 5 is a graph of a simulation of a branched preamble detector with differing numbering of branches.

FIG. 5 is a graph 500 of an example of a simulation of branched preamble detectors with differing numbers of branches. The y-axis 520 is the SNR in dB at which 50% of preambles are detected. The x-axis 530 is the CFO in parts per million ppm for a 5 GHz carrier. The result 501 with only 1 branch shows that the required SNR rapidly increases with increasing CFO. As the number of branches increases the best case sensitivity, 540, −11.5 dB, becomes marginally worse by about 0.5 dB, however there is a benefit across the complete range of allowable CFO. The result 505, representing the example case of 5 branches, has a minimum SNR sensitivity 520 of about −8.8 dB but still has a variation in the order of 2.3 dB across the CFO range. The results 509 and 515, representing 9 and 15 branches respectively, have a minimum sensitivity in the order of −10.7 dB across the complete CFO range.

With reference to the results shown on FIG. 5, in one embodiment of this disclosure the number of branches selected is nine resulting in 9 parallel preamble detectors tuned to [−20, −15, −10, −5, 0, +5, +10, +15, +20] ppm. Whichever branch asserts the detection event with the largest correlation may then be used to provide the estimate of the CFO observed in the received waveform.

Figure 6:
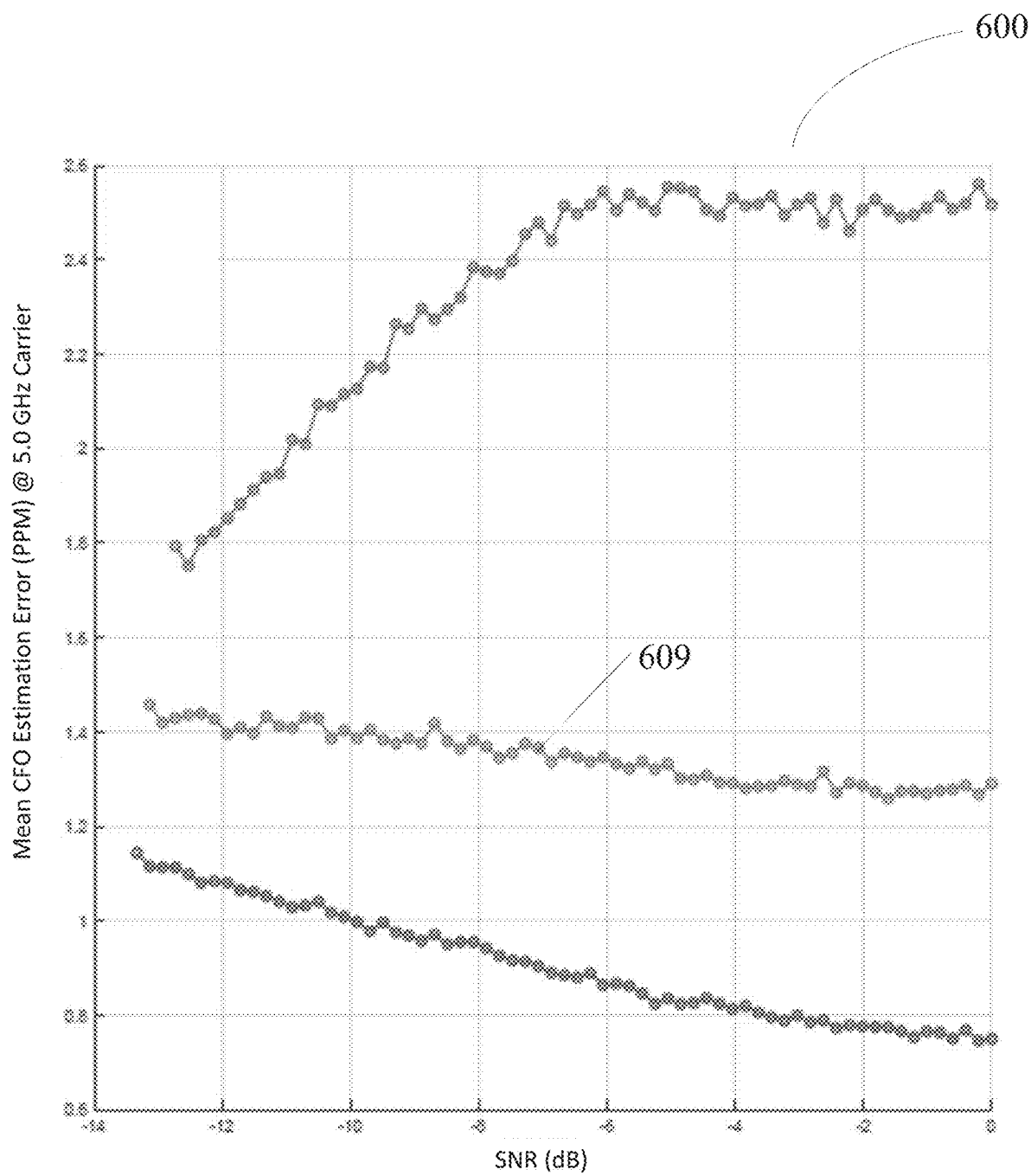
FIG. 6 is a graph of the mean CFO estimation error in ppm against SNR in dB.

FIG. 6 is a graph 600 of an example of the mean CFO estimation error in ppm against SNR in dB. When the branched preamble detector, as discussed above with reference to FIG. 5, selects the branch with the largest correlation, the estimated CFO is also provided. The maximum residual CFO error will be half the branch spacing and the average error will be half of this maximum. This mean error 609 is shown in FIG. 6 where, at the higher SNRs, the example 9 multi-branch detector can achieve an average CFO error of one quarter of the branch spacing, in the order of 1.3 ppm. The mean error 609, at the lower SNRs, is a CFO estimation error of about 1.4 ppm.

Figure 7:
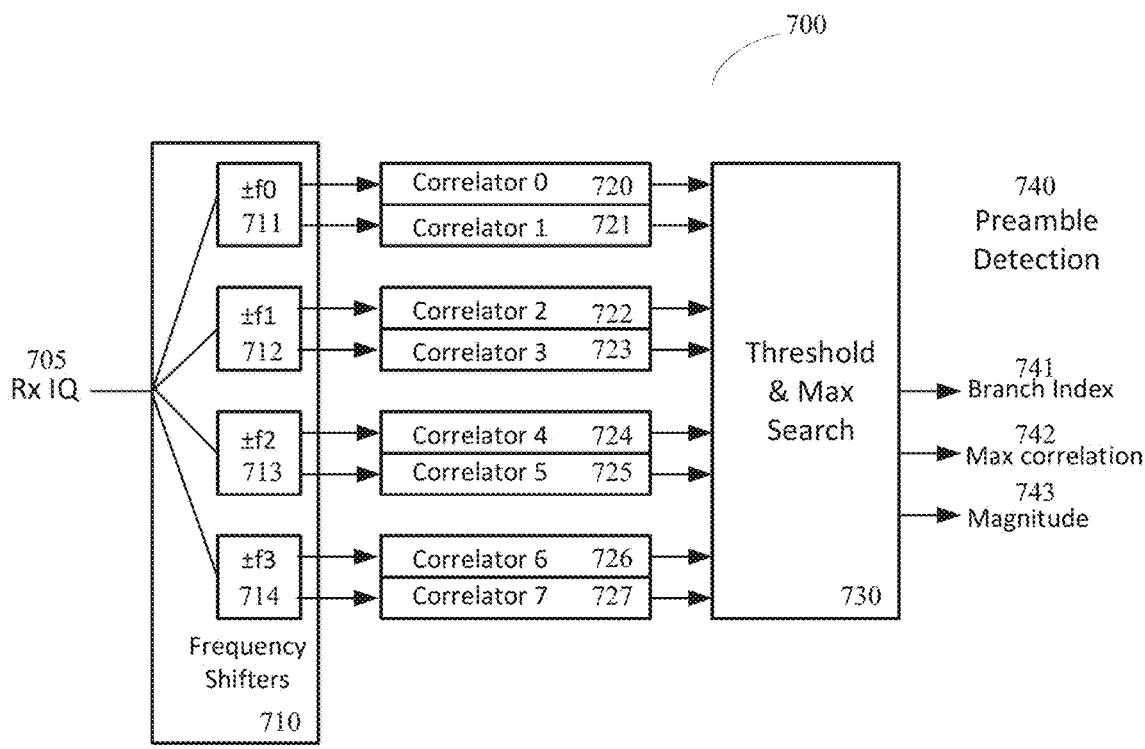
FIG. 7 is a functional block diagram of an exemplar OFDM branched preamble detector.

FIG. 7 is a functional block diagram of an exemplar OFDM branched preamble detector 700. The complex received baseband sampled stream 705 is inputted to a frequency shifter block 710. The frequency shifter block 710 comprises four frequency shifters 711, 712, 7113, and 714. Each frequency shifter 711, 712, 713 and 714 is configured with an independent frequency shift value and outputs two sample streams, one with a positive frequency shift and one with a negative frequency shift. The eight frequency-shifted sample streams are each fed into an independent correlation block 720, 721, 722, 723, 724, 725, 726, and 727 implementing a complex cross correlation searching for the entire 802.11 OFDM preamble. Each correlator 720 to 727 re-computes a complete, preamble-length, complex cross correlation in every sample period. The output of each correlator 720 to 727 is the raw correlation coefficient for that sample period. In parallel, the detector computes the total magnitude of the received samples over the duration of a preamble. The ratio of each raw correlation value and the magnitude value is a normalized correlation metric. The eight normalized correlation metrics are inputted to the Thresholding and Max Search block 730. The same correlation threshold may be applied to every branch. When any branch exceeds this threshold a search process may begin. This search process may run for a fixed time during which the logic selects the largest correlation metric from any branch. When the search is complete the detector may report the preamble detection 740 with the branch index with the highest correlation value 741, the maximum raw correlation value 742, and corresponding magnitude value 743. The IEEE 802.11 Standard allows frequency offsets of ±20 ppm. In the branched preamble example detector depicted in FIG. 7 an eight-branch architecture is shown so that evenly distributed branches would achieve acceptable performance across this ±20 ppm range at the highest 5 GHz center frequencies. The eight branches may be tuned at 5 ppm spacing for the received channel center frequency. The correlation threshold may be selected empirically. For example, when the input is pure noise a correlation threshold that resulted in approximately one false positive preamble detection event per second, may be selected.

Figure 8:
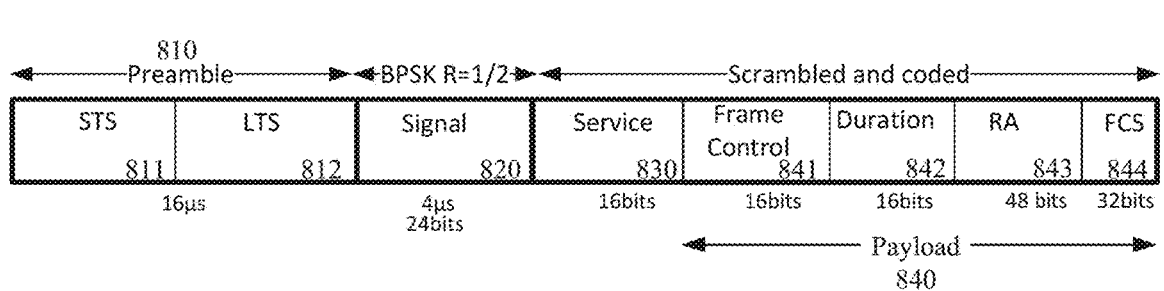
FIG. 8 is the format for CTS and ACK OFDM packets.

FIG. 8 is the format for CTS and ACK OFDM packets 800. As described in the IEEE 802.11 Standard, the 12 symbol OFDM preamble 810, comprising the STS 811 and the LTS 812, is followed by the 1 symbol signal field 820. The signal field 820 is modulated BPSK (binary phase shift keying) with rate 1/2 convolutional coding. The signal field 820 consists of the following sub-fields: Rate (4 bits), Reserved (1 bit), Length (12 bits) Parity (1 bit) and Tail (6 bits). The values of each bit in the signal field 820 for a CTS or ACK packet, responding to a known RTS or data null packet, are known. The signal field 820 is followed by the 16 bit service field 830 with bits 0-6 set to zero followed by 9 reserved bits. The service field 830 is followed by the payload 840 comprising the frame control field 841, the duration field 842 the receiver address RA 843 and the frame check sum FCS 844. Bits 0-6 of the service field 830 are transmitted first and are used to synchronize the descrambler in the receiver, as described in the IEEE 802.11 Standard. The transmit 7 bit scrambler seed is random but because the first 7 pre-scrambled bits are zero, the receiver can effectively recover the seed. If, however, there is a bit error in those first 7 bits, then the receiver cannot effectively recover the seed and cannot decode correctly the rest of the packet following the service field 830, including, in particular, the payload containing the frame control field 841 and the RA field 843.

There are a total of 48 coded data bits in the OFDM signal field. These bits represent a unique 48-bit sequence for 6 Mbps OFDM Ack and CTS packets. If these bits can be extracted from a received waveform, valid but non-Ack or CTS OFDM packets may be rejected if the signal field parameters do not match.

In one embodiment of this disclosure, an OFDM preamble detector, as discussed above with reference to FIG. 7, may be followed by a modified OFDM detector which attempts to demodulate the signal field. The signal OFDM detector implements the channel estimation, equalization, and demodulation processes discussed above. In particular, the detector/demodulator does not implement a decoder for the convolutional coding or a descrambler. Instead the detector/demodulator operates solely on the 48 coded bits in the raw signal field. The received, coded bit sequence may be compared to the target bit sequence which is a known coded signal field for a 6 Mbps OFDM CTS or data null. It may be noted that this comparison benefits from the coding, as the convolutional code achieves a large minimum distance between adjacent 48-bit codewords. Hence, this embodiment can identify the target bit sequence even when multiple bit errors occur in the received coded signal field.

Figure 9:
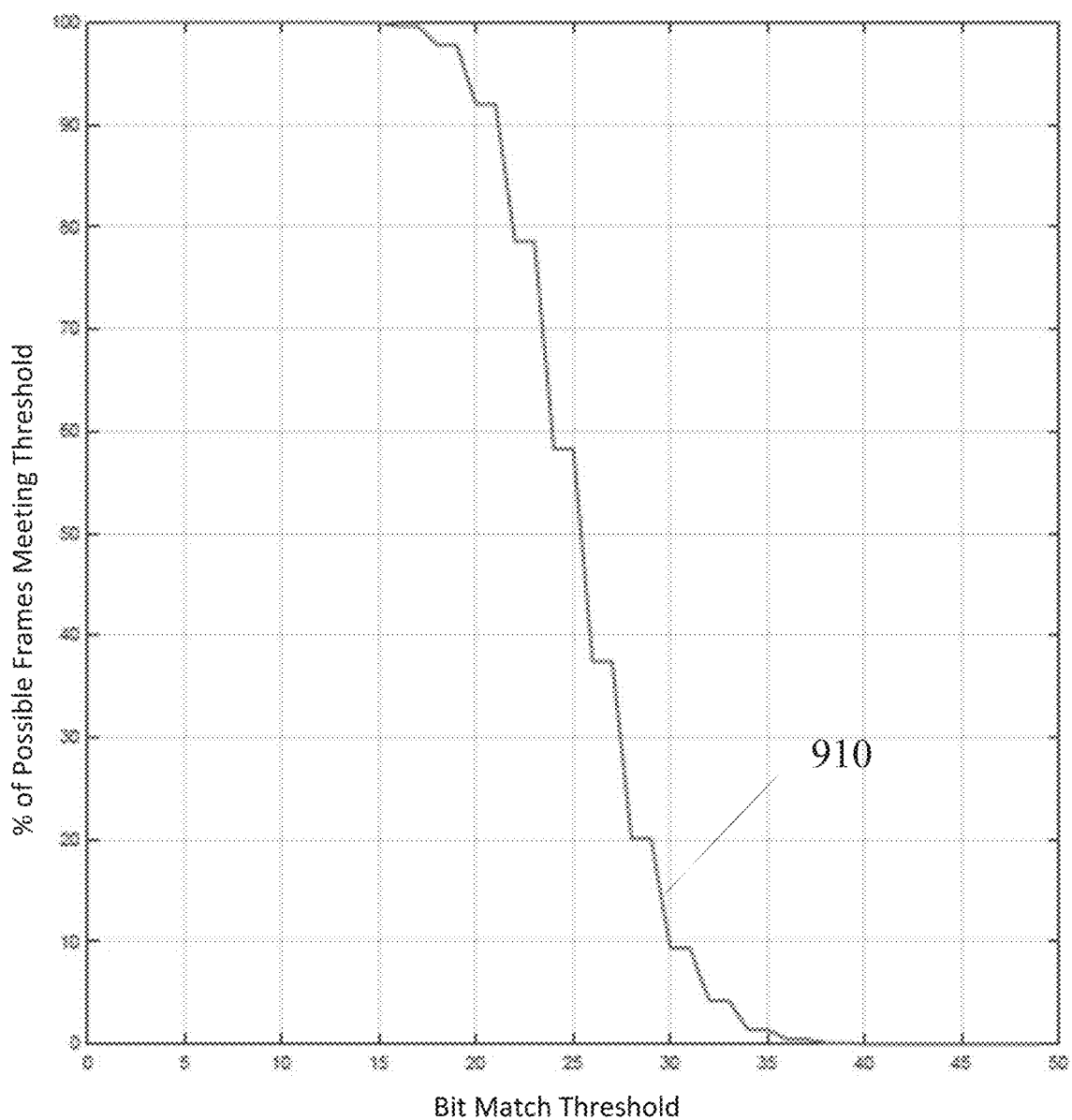
FIG. 9 is a graph plotting the probability of a random but valid SIGNAL field matching more than some number of bits in a coded CTS or ACK SIGNAL field.

Considering the 48 coded bits in the signal field of an OFDM 6 Mbps CTS or ACK packet, these bits can be compared to other valid signal fields formed by other valid rate and length combinations in order to determine how to set the bit matching threshold. FIG. 9 is a graph plotting an example of the probability of a random but valid signal field matching more than some number of bits in a coded CTS or ACK signal field. The coded signal field bit sequence is computed for every valid combination of rate and length, and then compared against the signal field bit sequence of the target CTS or ACK sequence in order to count how many of the 48 coded bits match. The x-axis is the matching threshold percentage, from 0, 0%, (every signal "matches") to 48, 100%, (only the 6 Mbps, 14-byte signal for a CTS or ACK matches). For a given threshold, a certain percentage of valid-but-unwanted signal fields will falsely match the desired bit sequence. Referring to FIG. 9, a threshold of 30 matching bits 910 would reject around 90% of unwanted signal fields. Requiring only 30 bits of the desired sequence to determine a correct match provides a significant improvement in sensitivity as compared to requiring all 48 coded bits to match.

The probability of a bit error, Pb, for BPSK, is $$Pb = 0.5 \, erfc\sqrt{E_b/N_0} \quad (5)$$

Where
"erfc" is the Gauss complimentary error function
$E_b$ is energy per bit
$N_0$ is noise per hertz
For BPSK, $E_b/N_0$ is equal to the signal to noise ratio, SNR.

The packet error rate, PER, is related to the bit error, Pb by the expression $$PER = 1 - (1 - Pb)^N, \quad (6)$$

Where N is the number of bits in the packet
For a packet error rate PER=0.5 (50%), with N=48, from equations (5) and (6) Pb=0.01425 and Eb/No=SNR=3.8 dB.

The received signal level, Pr, can be calculated using the standard formula:

$$Pr = 10 \log(1000 KT) + 10 \log BW + NF + SNR \text{ dBm} \quad (7)$$

Where
K is Boltzmann's constant
T is temperature in degrees Kelvin
BW is the occupied bandwidth, Hz
NF is the noise figure, dB
For T=20° Celsius, 10 log (1000 K T)=−174 dBm
BW=20 MHz for OFDM and assuming NF=3 dB and SNR=3.8 dB, from (7) Pr=−94.2 dBm.

Hence, the theoretical received signal level for receiving 48 bits with 50% success rate is −94.2 dBm. As described in the IEEE 802.11 Standard, the OFDM bits are coded before transmission by a convolutional code and in the receiver a Viterbi decoding scheme is recommended. The result is that there is a theoretical coding gain of about 5.5 dB. Thus, the theoretical, best received signal level for a 48 bits and 50% PER is −99.7 dBm. In practice, implementation losses result in a sensitivity that is several dBs less than this figure.

Now, for example, consider receiving a series of bits at a signal level of Pr=−111 dBm. From equation (7) the input SNR=−13 dB. From equation (6) the bit error Pb=0.375. Hence, 62.5% of the detected bits are correct, or, of the 48 bits, about 30 bits are correct and 18 are in error. As discussed with reference to FIG. 9, this bit match threshold corresponds to a 10% probability of falsely matching the desired bit sequence, or, a 90% probability of correctly identifying the desired sequence.

Thus, as per this example, if 30 bits of the total 48 bits of the CTS or ACK signal field are correct then it might quite safely be assumed that the packet was indeed a CTS or ACK that was expected. Hence, if all the bits of the CTS or ACK are known in advance, then the received bits may be compared to the expected bits and a decision taken as to whether a CTS or ACK had indeed been received. This technique is known as "correlation" where the decision is based upon a correlation threshold.

In the general sense, how correlation works is that the known pattern is passed across the noisy pattern, and if the bits agree, they add, if not they subtract.
For a packet of N bits, N*Pb bits will not match and N*(1−Pb) will match, Hence Correlation %=100(Match−Mismatch)/Total or Correlation %=100(N−2 N Pb)/N=100(1−2Pb) (8)

Hence, for Pb=0.375, Correlation %=100(1−2× 0.375)=25%

Note that for pure noise, Pb=0.5 and hence 24 bits will agree (match), 24 will not agree (mismatch) and the correlation will be 0%.

If the raw detected 48 bits of the coded signal fields of the OFDM CTS or OFDM ACK packets are correlated across the known bits of the signal field, then it is possible to detect a CTS or ACK packet that is well below the noise level.

For a given SNR, the bit error Pb may be calculated from equation (5) and the correlation % calculated from equation (8). Assuming a binomial distribution, the variance and standard deviation σ for the correlation % may be calculated:

$$\sigma^2 = NPb(1-Pb)$$

$$\sigma = \sqrt{NPb(1-Pb)} \quad (9)$$

Figure 10:
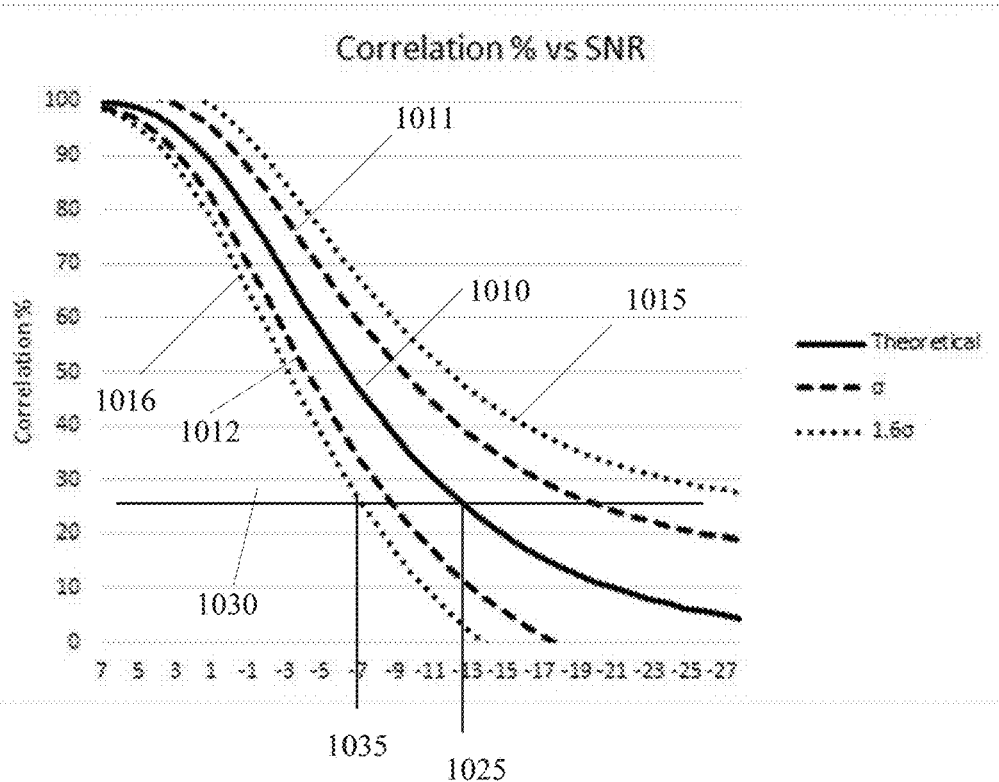
FIG. 10 is a graph of Correlation % versus SNR for 48 bits.

FIG. 10 is a graph of Correlation % versus SNR for 48 bits. The theoretical correlation 1010 is calculated using equation (8). Also plotted are the deviations, +σ and −σ, 1011 and 1012 respectively. There is a 90% probability that the result is within the range +1.6σ and −1.6σ, and these values are plotted 1015 and 1016 respectively. The theoretical curve 1010 has an SNR value of about −13 dBm 1025 for a correlation of 25%. For SNR=−27 dB and less, the input signal may be considered to be close to pure noise. From the 1.6σ curve 1015, for SNR=−27 dB, the correlation is in the order of 27% 1030. Hence, there is a 10% probability that noise will result in a correlation of about 27%. From the 1.6σ curve 1016 the correlation threshold of 27% corresponds to an SNR of about −7 dB 1035. Hence, if the correlation threshold is set at 27% there is a 90% probability that the signal field will be correctly detected at SNRs greater than −7 dB.

Figure 11:
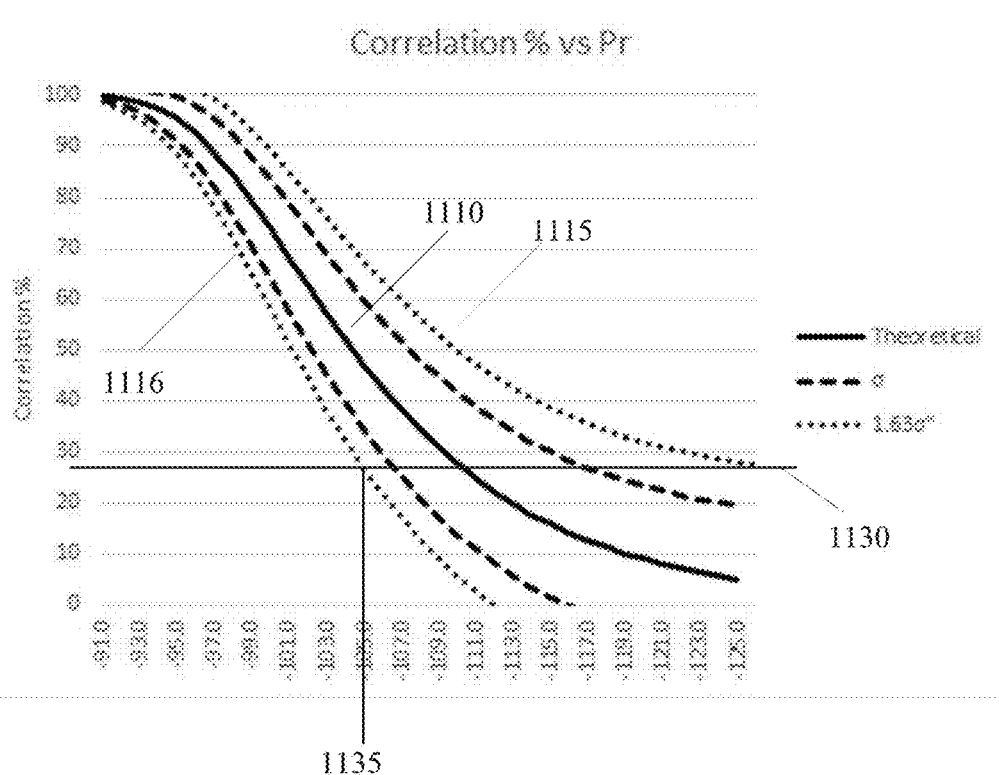
FIG. 11 is a graph of Correlation % versus received signal power Pr for 48 bits.

FIG. 11 is an example graph of Correlation % versus received signal power Pr for 48 bits. FIG. 11 is similar to FIG. 10 but the received signal strength Pr, as calculated using equation (7) assuming a noise figure of 3 dB, is shown as the horizontal axis in place of SNR. The theoretical correlation 1010 is calculated using equation (8). There is a 90% probability that the result is within the range +1.6σ and −1.6σ, and these values are plotted 1115 and 1116 respectively. For Pr −125 dB and less, the input may be considered as close to pure noise. With reference to FIG. 11, for receive signal levels less than −125 dBm, there is a 10% probability that noise will result in a correlation of 27%, 1130, which relates to a signal level of about −105 dBm, 1135. Hence, theoretically, selecting a correlation threshold of 27% should result in greater than 90% detection of signals greater than −105 dBm.

The theoretical analysis that results in a correlation of 27% threshold for a 90% confidence, is close to the result of the simulation discussed with reference to FIG. 9 where a 30 bit out of 48 match requirement resulted, which is the equivalent of 25% correlation.

If the correct scrambler seed could be identified then it would be possible to correlate across the complete coded packet, i.e. the signal, service, and payload fields, a total of 304 bits.

Figure 12:
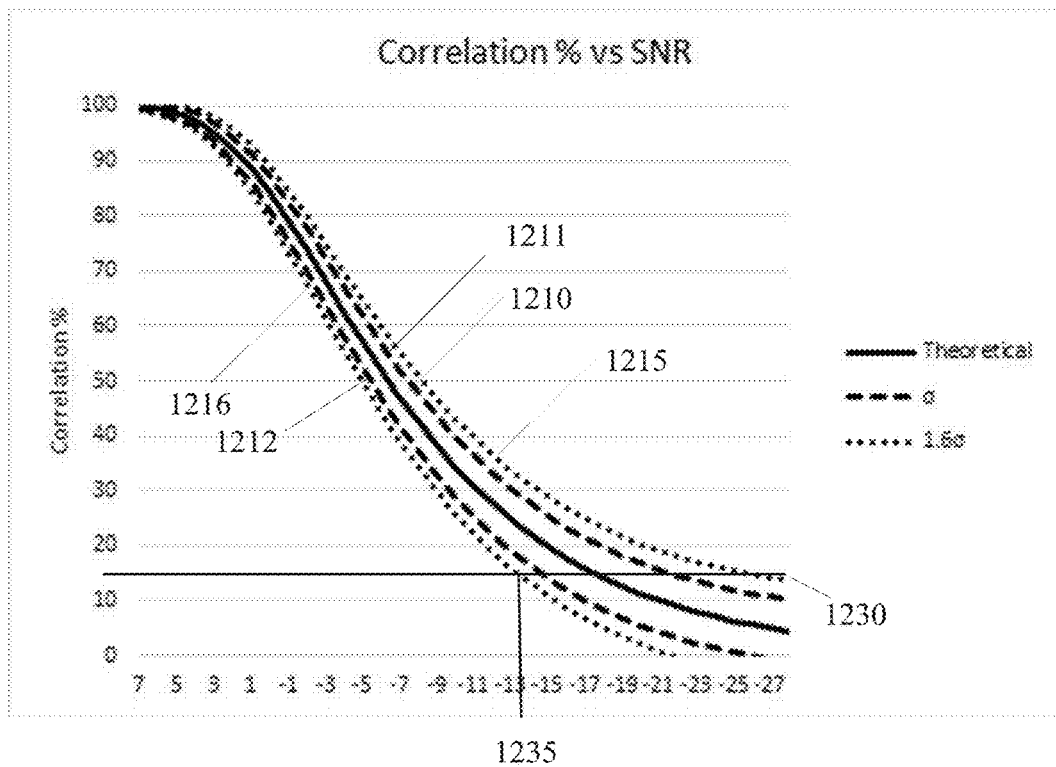
FIG. 12 is a graph of Correlation % versus SNR for a packet of 304 bits.

FIG. 12 is an example graph of Correlation % versus SNR for a packet of 304 bits. The theoretical correlation 1210 is calculated using equation (9). Also plotted are the deviations, +σ and −σ, 1211 and 1212 respectively. There is a 90% probability that the result is within the range +1.6σ and −1.6σ, and these values are plotted 1215 and 1216 respectively. For SNR=−27 dB and less, the input is close to pure noise. From the 1.6σ curve 1215, for SNR=−27 dB, the correlation is in the order of 15% 1330. Hence, there is a 10% probability that noise will result in a correlation of about 15%. From the −1.6σ curve 1216 a correlation of about 15% corresponds to an SNR of about −13 dB 1235. Hence, if the correlation threshold is set at 15% there is a 90% probability that the 304 bit packet will be correctly detected at SNRs greater than −13 dB.

Figure 13:
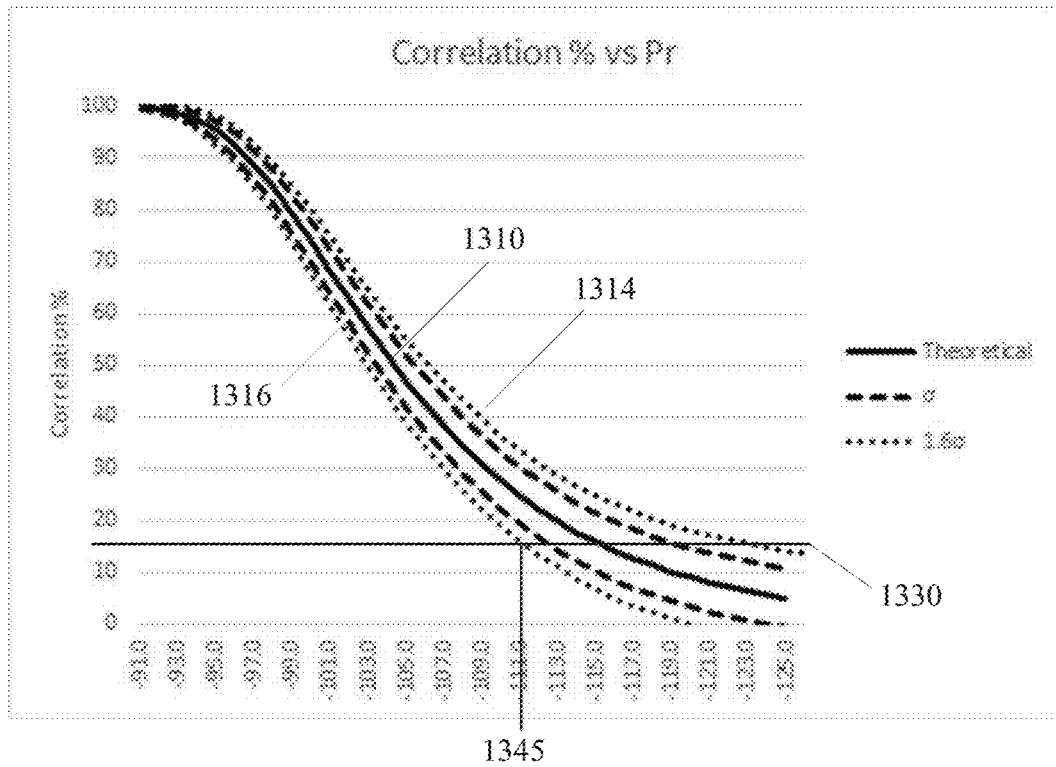
FIG. 13 is a graph of Correlation % versus received signal power Pr for a packet of 304 bits.

FIG. 13 is an example graph of Correlation % versus received signal power Pr for a packet of 304 bits. FIG. 13 is similar to FIG. 12 but the received signal strength Pr, as calculated using equation (8) assuming a noise figure of 3 dB, is shown as the horizontal axis in place of SNR. The theoretical correlation 1310 is calculated using equation (9). There is a 90% probability that the result is within the range +1.6σ and −1.6σ, and these values are plotted 1315 and 1316 respectively. For Pr −125 dB and less, the input is close to pure noise. The graph shows that for receive signal levels less than −125 dBm, there is a 10% probability that noise will result in a correlation of 15%, 1330 which relates to a signal level of about −111 dBm, 1335. Hence, theoretically, selecting a correlation threshold of 15% may result in greater than 90% detection of wanted signals greater than −111 dBm.

As discussed above with reference to FIG. 8, the service and payload fields may be scrambled before being coded. There are 128 possible scrambling seeds, 0 to 127. In the 802.11 Standard the all zero seed is not used and hence there are in practice only 127 possible seeds, 1-127. Although there are strictly only 127 scrambler seeds, it is assumed for the purposes of this disclosure that there are 128 possible seeds. In another embodiment of this disclosure, the demodulated raw 256 bits that correspond to the coded service and payload fields of the received packet 324 are descrambled using each of the 128 possible seeds. The resulting de-scrambled bits are then appended to the raw received bits corresponding to the 48 bits coded signal field to produce 128 versions of the raw 304 bit received packet. Each of these 128 possible bit streams may then be compared or correlated against the actual received raw 304 bits. If the correlation threshold is exceeded, then it may be assumed that this corresponds to the correct scrambler seed. As discussed above with reference to FIGS. 12 and 13, this may result in greater than 90% detection of wanted signals at a signal level greater than −111 dBm, a 6 dB increase in sensitivity over the embodiment that only correlates against the signal field.

Figure 14:
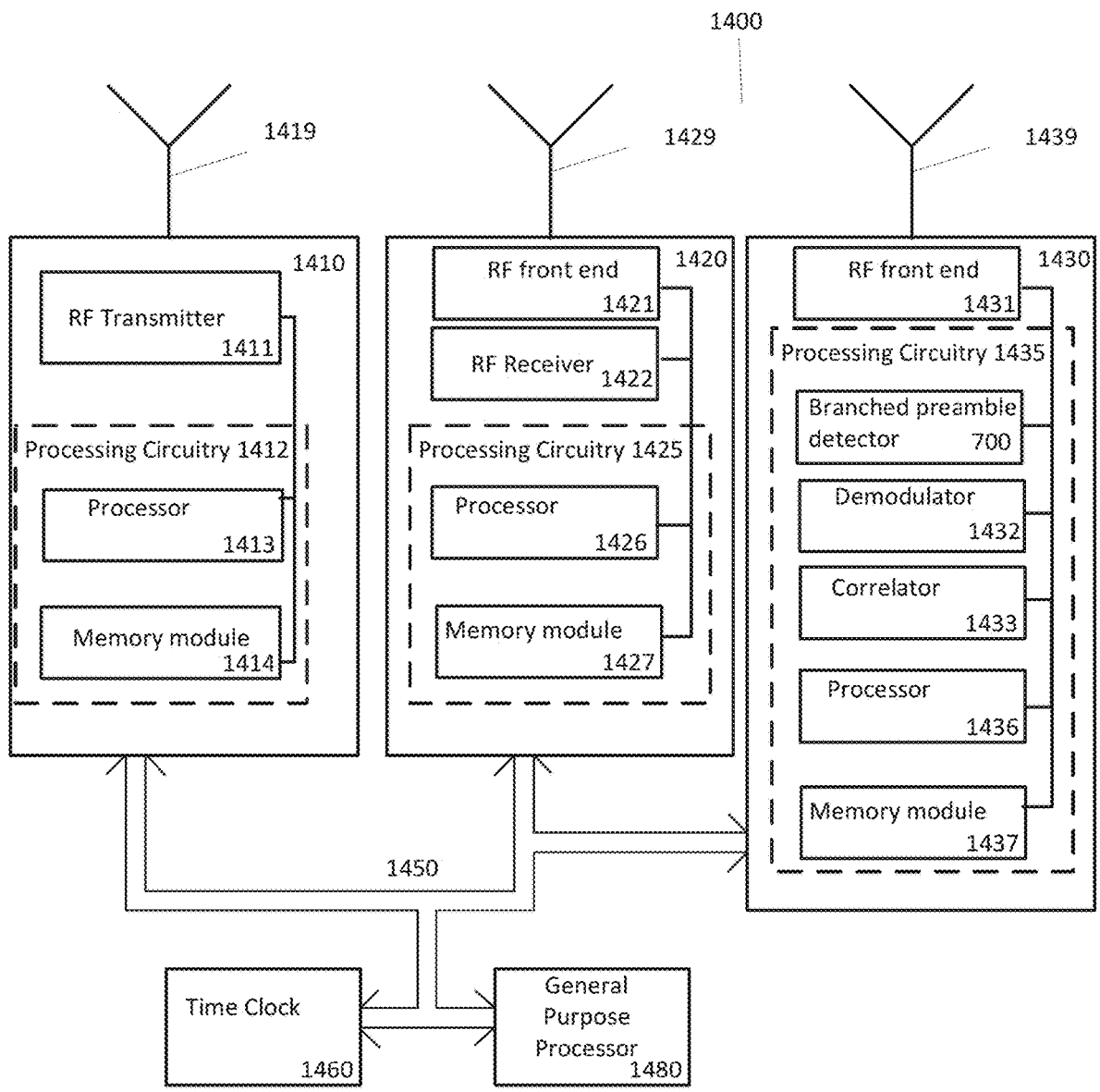
FIG. 14 illustrates a block diagram of an example wireless communication device which, according to an embodiment of the disclosure, may be used as or as part of the airborne measuring station

FIG. 14 illustrates a block diagram of an example wireless communication device 1400 which, according to an embodiment of the disclosure, may be used as all or as part of the measuring station 110.

The wireless communication device 1400 may be any device capable of wirelessly receiving signals and transmitting signals and may be configured to execute any of the methods of the IEEE 802.11-2016 Standard. Wireless communication device 1400 may be one or more wireless devices that are based upon the IEEE 802.11 specification and each may be configured to act as a transmitter or a receiver. The embodiment described herein is that where wireless measuring station 1400 includes a wireless transmitter 1410, a first wireless receiver 1420 and a second wireless receiver 1430. The wireless measuring station 1400 may also include a time clock 1460 and a general purpose processor 1480 which are interconnected to the three wireless devices 1410, 1420 and 1430 by a data bus 1450.

In some embodiments, the wireless transmitter 1410 includes an RF transmitter 1411 and processing circuitry 1412 that includes processor 1413, and memory module 1414. The wireless transmitter 1410 may also include one or more wireless antennas such as wireless antennas 1419. The RF transmitter 1411 may perform the functions of scrambling, encoding, interleaving, mapping pilot insertion, IFFT (inverse fast Fourier transform), guard interval insertion and I-Q modulation as described in IEEE 802.11-2016, and amplification for the transmission of the OFDM packets via the antenna 1419. In some embodiments the processing circuitry 1412 and/or the processor 1413 may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions. In some embodiments some functions of the RF transmitter 1411 may be performed by the processing circuitry 1412. The processing circuitry 1412 may be configured to control any of the methods and/or processes described herein and/or to cause such methods, and/or processes to be performed, e.g., by the wireless transmitter 1411. The memory module 1414 may be configured to store data, programmatic software code and/or other information described herein. In some embodiments, the software may include instructions that, when executed by the processing circuitry 1412, causes the processing circuitry 1412 to perform the processes described herein with respect to the wireless transmitter 1410.

In some embodiments, the wireless receiver 1420 includes an RF front end 1421, an RF receiver 1422, processing circuitry 1425 that includes a processor 1426 and a memory module 1427, and one or more wireless antennas such as wireless antenna 1429. The RF front end 1421 may perform the usual functions of an RF receiver front end such as low noise amplification, filtering and frequency down conversion so as to condition the received signal suitable for inputting to the RF receiver 1422. The RF receiver 1422 may perform the Wi-Fi OFDM functions of I-Q demodulation, guard interval removal, FFT (fast Fourier transform), pilot removal, de-interleaving, de-mapping, decoding and descrambling so as to condition the received signal suitable for inputting to the processing circuitry 1425. In some embodiments the RF receiver 1422 and/or the processing circuitry 1425 may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions. In some embodiments some or all of the functions of the RF receiver 1422 may be performed by the processing circuitry 1425. The processing circuitry 1425 may be configured to control any of the methods and/or processes described herein and/or to cause such methods, and/or processes to be performed, e.g., by the wireless receiver 1420. The memory module 1427 is configured to store data, programmatic software code and/or other information described herein. In some embodiments, the software may include instructions that, when executed by the processing circuitry 1425, causes the processing circuitry 1425 to perform the processes described herein with respect to the wireless receiver 1420.

In some embodiments, the receiver station 1430 includes an RF front end 1431, processing circuitry 1435 that includes a branched preamble detector 700, a demodulator 1432, a correlator 1433 a processor 1436 and a memory module 1437, and one or more wireless antennas such as wireless antenna 1439. Of note, although FIG. 14 shows the branched preamble detector 700, demodulator 1432 and correlator 1433 as elements that are separate from the processor 1436 and memory module 1437, implementations are not limited to such. It is contemplated that one of more of the branched preamble detector 700, demodulator 1432 and correlator 1433 can be implemented using the processor 1436 and the memory module 1437. The RF front end 1431 may perform the usual functions of an RF receiver front end such as low noise amplification, filtering and frequency down conversion so as to condition the received signal suitable for inputting to the processing circuitry 1435. The conditioned received signal may first be inputted to the branched preamble detector 700. The branched preamble detector 700 may perform the preamble detection as discussed above with reference to FIG. 7. The detected output from the branched preamble detector 700 may then be inputted to the demodulator 1432 that may perform the Wi-Fi OFDM functions of I-Q demodulation, guard interval removal, FFT (fast Fourier transform), pilot removal, de-interleaving, and de-mapping, so as to condition the received signal suitable for inputting to the correlator 1433. The correlator 1433, in one embodiment, may perform the function of correlating the conditioned demodulated received bits that correspond to the 48 bits of the signal field as discussed above with reference to FIGS. 10 and 11. Alternatively, in another embodiment, the correlator 1433 may perform the function of correlating to all the 304 conditioned, demodulated received bits with 128 versions of the scrambled and coded bit stream as discussed above with reference to FIGS. 12 and 13. The processor 1436 may be configured to control any of the methods and/or processes described herein and/or to cause such methods, and/or processes to be performed, e.g., by the wireless receiver 1430. The memory module 1437 is configured to store data, programmatic software code and/or other information described herein. In some embodiments, the software may include instructions that, when executed by the processing circuitry 1435, causes the processing circuitry 1435 to perform the processes described herein with respect to the wireless receiver 1430. In some embodiments the processing circuitry 1435, may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions.

According to this embodiment of the disclosure the wireless receiver 1420 may be configured to measure and monitor an input signal's attribute, such as may include one or more of a ranging signal transmitted by wireless transmitter 1410, data and control packets, and the response signal, including control packets, transmitted by an access point or station that may be based upon the IEEE 802.11-2016 Standard. Such packets may include data null, ACK, RTS and CTS packets. The memory module 1427 may store instructions for executing any method mentioned in the IEEE 802.11-2016 Standard, input signals, and results of processing by the processor 1426, signals to be outputted and the like.

According to an embodiment of the disclosure the RF transmitter 1411 may be configured to transmit signals and the processing circuitry 1412 may be configured to prepare the transmitted signal attributes based upon the IEEE 802.11-2016 Standard. Such transmitted packets may include data packets, control packets and management packets that are to be transmitted by a wireless station that is based upon the IEEE 802.11. Such control packets may include RTS and data null packets. The memory module 1414 may store instructions for executing any method mentioned in the specification, input signals, and results of processing by the processor 1413, signals to be outputted and the like.

According to another embodiment of the disclosure, the wireless receiver 1420 may be configured to receive the transmissions of the transmissions of the wireless transmitter 1410 and the processing circuitry 1425 may be configured to monitor the attribute of the transmissions and determine the value of the time of departure of the transmissions from the wireless transmitter 1410. These times may be accomplished by outputting a trigger that is timed to coincide with the reception packet from the wireless transmitter 1410. This trigger may then be used to read the time from the time clock 1460. Time clock 1460 may have a precision that is higher than the internal TSF timer that is part of the wireless receiver 1420.

According to an embodiment of the disclosure the wireless transmitter 1410 may be configured to transmit packets to another wireless communication device and the processing circuitry 1412 may be configured to prepare the attributes of the packet to be transmitted.

According to another embodiment of the disclosure, the wireless receiver 1430 may be configured to receive the transmissions of another target station, e.g., wireless communication 120 and the processing circuitry 1435 may be configured to monitor an attribute of the transmissions of the other wireless communication device, and determine the value of the time of arrival of packets from the other wireless communication device. These times may be accomplished by outputting a trigger that is timed to coincide with the reception packet from the other target station 120, e.g., wireless device or the wireless transmitter 1410. This trigger may then be used to read the time from the time clock 1460. Time clock 1460 may have a precision that is higher than the internal timer that is part of the wireless receiver 1430.

According to an embodiment of the disclosure, a general purpose processor 1480 may be used to control the operations of the measuring station 1400 and in particular wireless transmitter 1410, the wireless receiver 1420, and wireless receiver 1430. The general purpose processor 1480 may also carry out the various calculations as described in this disclosure and may also prepare the measurement results for disclosure to an operator or user. In some embodiments, the general purpose processor 1480 can be a computing device such as a tablet computer, desktop computer, laptop computer, or distributed computing, e.g. cloud computing. In some embodiments, the general purpose processor 1480 can be a processor/CPU in the tablet, laptop computer, desktop computer, or distributed computing environment, etc. In some embodiments the general purpose processor 1480 may comprise integrated circuitry for processing and/or control, e.g. one or more processors and/or processor cores and/or FPGAs (Field Programmable Gate Array) and/or ASICs (Application Specific Integrated Circuitry) configured to execute programmatic software instructions and may include a memory module to execute programmatic code stored in the general purpose processor or another device. It is also noted that the elements of the measuring station 1400 can be included in a single physical device/housing or can be distributed among several different physical devices/housings. Processor 1480 may be used to perform the various calculations as described in this disclosure and may also prepare the measurement results for disclosure to an operator or user.

Figure 15:
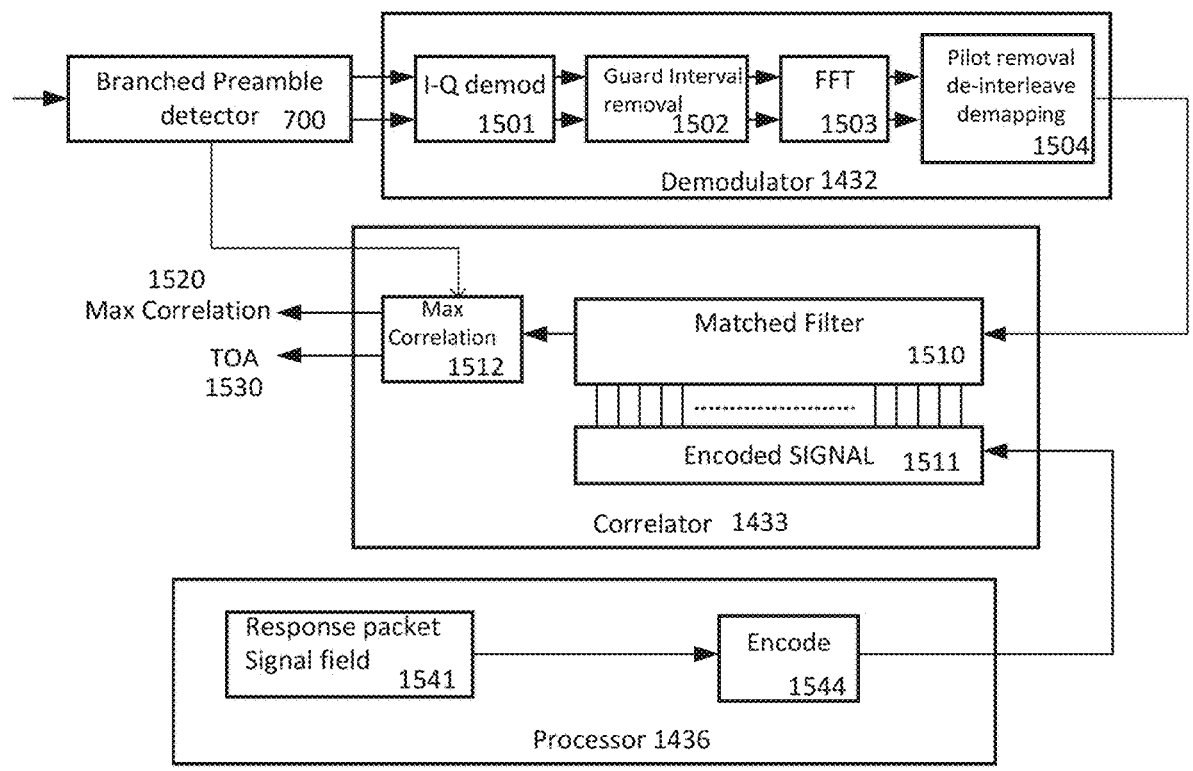
FIG. 15 is a functional block diagram of an example of the functional blocks that may be used in a receiver that correlates the raw 48 bits of the SIGNAL field.

FIG. 15 is a functional block diagram of an example of the functional blocks that may be used in a receiver 1430 that correlate the raw 48 bits of the signal field as discussed above with reference to FIGS. 10 and 11. The received signal is detected by the branched preamble detector 700 and then demodulated in the demodulator block 1432. Demodulator 1432 may perform the OFDM demodulation functions including I-Q demodulation 1501, guard interval removal 1502, FFT 1503 and pilot removal, de-interleaving and de-mapping 1504, as described in the IEEE 802.11-2016 Standard. The demodulator block 1432 outputs the detected, demodulated raw bit stream which may be inputted to the correlator block 1433. In this embodiment, in the processor 1436, only the 48 bits corresponding to the signal field are constructed (block 1541) and then encoded 1544, as discussed above, to generate the 48 raw bits of the expected signal field. In the correlator block 1433, the received raw bits from the demodulator 1432 may be correlated in the matched filter 1510 with the expected 48 bits 1511 from the processing circuitry 1435. The maximum correlation 1520 is detected in block 1512 and outputted together with the TOA 1530.

Figure 16:
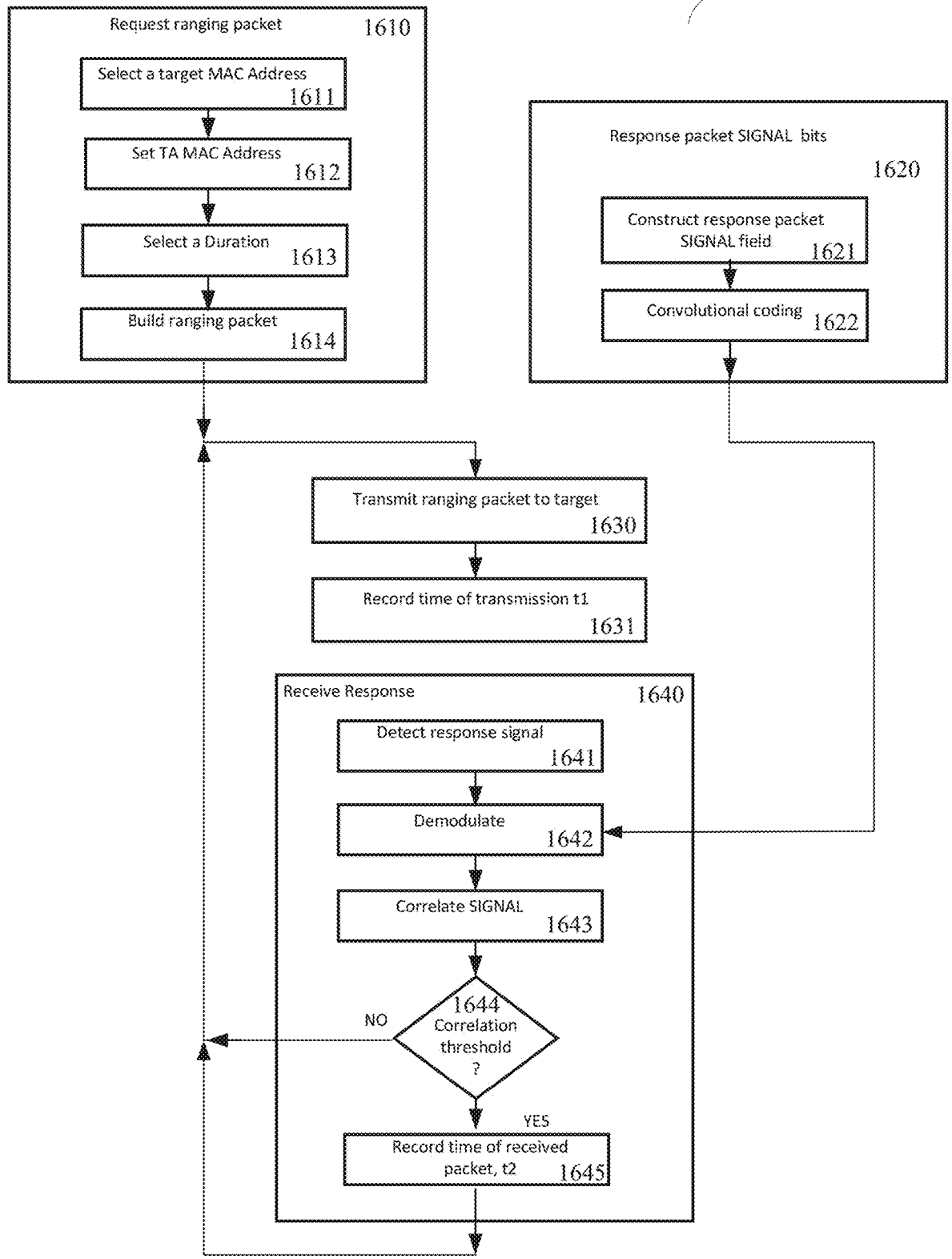
FIG. 16 is a flow diagram of process, an example of one embodiment of the disclosure where only the 48 raw bits corresponding to the signal field of the received packet are used.

FIG. 16 is a flow diagram of process 1600, which is a non-limiting example of one embodiment of the disclosure where only the 48 raw bits corresponding to the signal field of the received packet are used. The process 1600 may include step 1610 where the ranging packet 212 is constructed. The ranging packet 212 may be constructed by the processing circuitry 1412 based upon input from the general purpose processor 1480. Step 1610 may include and start with step 1611 where the MAC address of the target station 120 is selected. This selection may be based upon an input from the general purpose processor 1480 and performed by the processing circuitry 1435. Step 1610 may include and step 1611 may be followed by step 1612 where the MAC address to be used in the ranging packet 312 is set. In the ranging packet 312, which may be an RTS or a data null, this MAC address will be the TA Address. The selection of the TA may be based upon an input from the general purpose processor 1480 and performed by the processor 1436. In the corresponding response packet 324, this MAC address will be the RA 843. Step 1610 may include and step 1612 may be followed by step 1613 where a duration value is selected for the MAC header of the ranging packet 312. This effectively sets the value of the duration field 842 expected in the service field of the response packet 324. The selection of the duration value may be based upon an input from the general purpose processor 1480 and performed by the processing circuitry 1435. Step 1610 may include and step 1613 may be followed by step 1614 where the MAC header and payload for the ranging packet 312 is constructed. Step 1610 may be followed by step 1630 where the ranging packet 312 may be transmitted. This transmission may be undertaken by RF Transmitter 1411 of the wireless transmitter 1410. Step 1630 may include taking the MAC Header and payload constructed in step 1614, adding the preamble and header, and then scrambling, encoding and modulating the bits as described in the IEEE 802.11 Standard and as discussed above with reference to FIG. 8. The process of taking the MAC Header and payload constructed in step 1614, adding the preamble and header, and then scrambling, encoding and modulating the bits may be performed by the processing circuitry 1412 in the wireless transmitter 1410. Step 1630 may be followed by step 1631 where the time t1 of transmission of the ranging packet 312 is recorded. The recording of the time t1 of transmission of the ranging packet 312 may be performed by the wireless receiver 1420.

The process 1600 may include step 1620 where the expected raw bits for the response packet 324 signal field are determined. The determination of the signal field bits may be performed by the processing circuitry 1435 and may be based upon inputs from the general purpose processor 1489 and/or the processing circuitry 1412. Step 1620 may include and start with step 1621 where the 24 raw bits of the signal field (rate, length and parity) are set. Step 1620 may include and step 1621 may be followed by step 1622 where the signal field is coded using the convolutional code as specified in the IEEE 802.11 Standard increasing the number of bits to 48. The convolutional coding may be performed by the processor 1436. The output from step 1620 is the 48 bit stream representing the encoded signal field of the expected response packet 324.

Process 1600 may include step 1640 where it is determined if a response packet 324 is received. The response packet may be received by wireless receiver 1430. Step 1640 may include and start with step 1641 where the incoming received signal is detected, as discussed above with reference to FIG. 7. The incoming signal may be detected by the branched preamble detector 700. Step 1640 may include and step 1641 may be followed by step 1642 where the detected packet is demodulated. The demodulation may be performed by demodulator 1432. The first 48 raw demodulated bits will corresponding to the signal field. Step 1640 may include and step 1642 may be followed by step 1643 where the first 48 bits of the detected and demodulated response signal may be correlated against the bit stream obtained from step 1620, as explained above with reference to FIGS. 10 and 11. The correlation may be performed by correlator 1433 and the matched filter 1510 and 1511. Step 1640 may include and step 1643 may be followed by step 1644 where it is determined if the correlation threshold resulting from the correlation process performed in step 1243 and as described above with reference to FIGS. 10 and 11, has been exceeded, indicating that it is probable that the expected response packet 324 has indeed been received. The determination of the threshold may be performed by the processor 1436 based upon the maximum correlation 1520. If it is determined that the threshold has been exceeded, then step 1640 may include and step 1644 may be followed by step 1645 where the time t2 of the received packet is recorded. The time t2 may be determined by the processing circuitry 1435 and may include input from the time clock 1460. The calculation of the distance from the measuring station 110 to the target station 120 is as described above in equations (2) and (4) where t1=T1 and t2=T4. The target station 120 may be a wireless device. The calculation of the distance may be performed by the processing circuitry 1435 and/or the general purpose processor 1480. The process may then return to step 1630 where another ranging packet 312 is transmitted or may terminate and restart at step 1610 for a different target station 120. Step 1644 may include a timeout such that if the correlation threshold has not been exceeded in a certain time then it is determined that the correlation threshold has not been exceeded and the process may then return to step 1630 where another ranging packet 312 is transmitted, or may terminate and restart at step 1610 for a different target station 120.

As discussed above, in one embodiment of this disclosure, the received response packet 324 is first detected and demodulated using a branched preamble detector as discussed above with reference to FIG. 7. Then the first demodulated 48 bits that correspond to the coded signal field are compared or correlated to the expected or known 48 bits for that coded signal field. Using a correlation threshold of about 27%, as discussed above in reference to FIGS. 10 and 11, a decision may be made that the expected response packet 324 has indeed been received and a timestamp may be placed on it. An advantage of this embodiment of the disclosure is that there is no requirement to descramble the received packet. In order to descramble the received packet 324, as discussed above with reference to FIG. 8, it would require that there were zero bit errors in the first 7 bits of the scrambled coded service field. As discussed above with reference to FIG. 10, a received response packet 324 at an SNR of around −7 dB may be detected and identified. At this level, the probability of a bit error in the first 7 bits of the service field is 88%, with the result that the correct scrambler code cannot be identified. Hence, in this embodiment of the disclosure the correlation is carried out solely on the coded signal field and there is no requirement to determine the scrambler seed or descramble the coded service field and payload.

Figure 17:
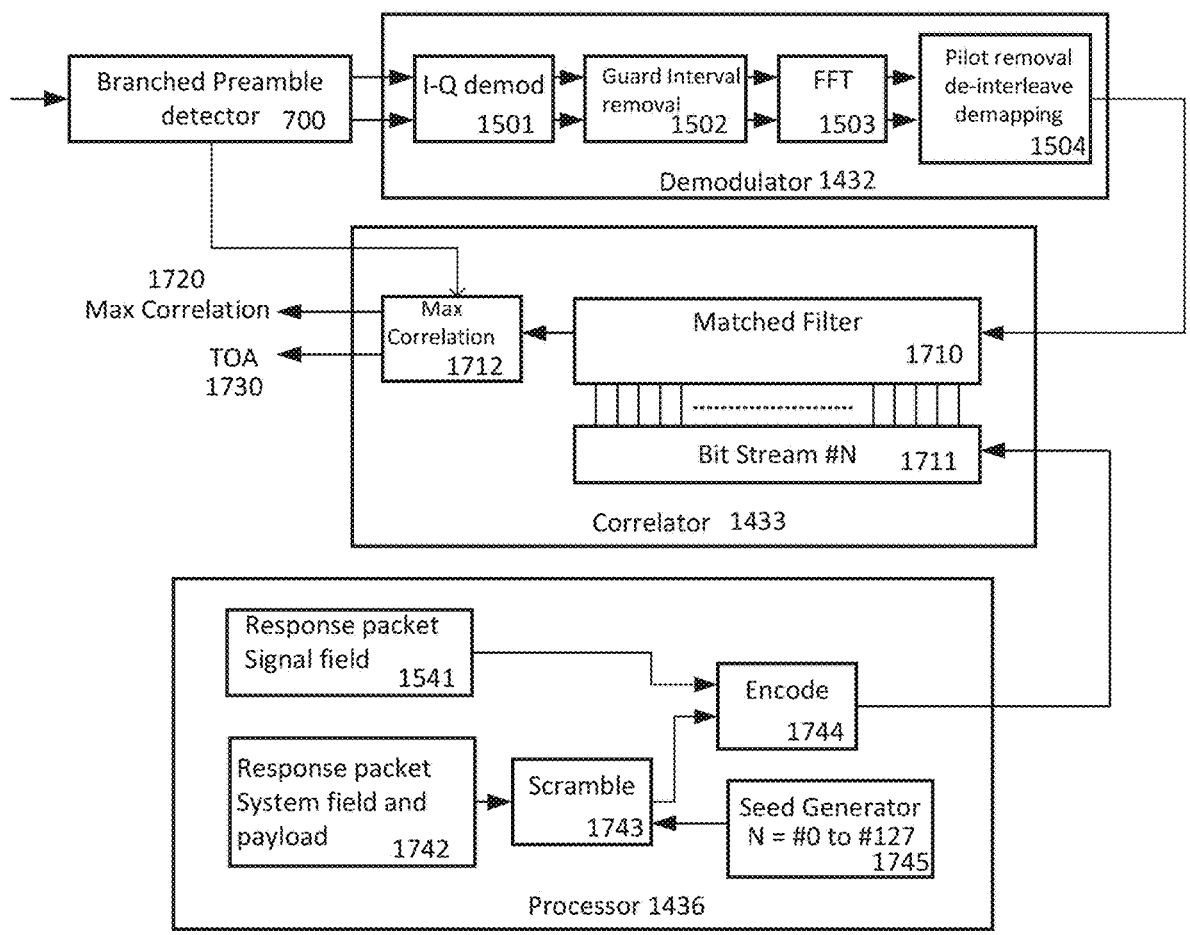
FIG. 17 is a functional block diagram of an example of the functional blocks that may be used in a receiver that correlates the 304 raw bits of the complete CTS or ACK packet.

FIG. 17 is a functional block diagram of an example of the functional blocks that may be used in a receiver 1430 that correlates the 304 raw bits of the complete CTS or ACK packet as discussed above with reference to FIGS. 12 and 13. The received signal is detected by the branched preamble detector 700 and then demodulated in demodulator block 1432. Demodulator block 1432 may perform the OFDM demodulation functions including I-Q demodulation 1501, guard interval removal 1502, FFT 1503 and pilot removal, de-interleaving and de-mapping as described in the IEEE 802.11-2016 Standard. The demodulator block 1432 outputs the detected, demodulated raw bit stream which may be inputted to the correlator block 1433. In this embodiment, in the processor 1436 the expected raw bits for the entire expected response packet 324 are constructed. The response packet system field and payload bits are constructed in block 1742 and then scrambled in block 1743 with a seed that is inputted from block 1745. The response packet signal field is constructed in block 1541. In block 1744 the signal field bits are added to the scrambled system field and payload bits and then encoded. In this embodiment, in the correlator block 1433 the received raw bits from the demodulator 1432 are correlated in the matched filter 1710 with the expected 304 bit stream 1711 from the processor 1436. The maximum correlation 1720 is detected in block 1712 and outputted together with the TOA 1730. In order to correlate against all 128 scrambler seeds, the matched filter 1710 may hold the detected demodulated bits while the processor 1436 generates each of the 304 bit streams corresponding to each of the scrambler seeds in turn, or, alternatively 128 parallel correlators, comprising matched filter 1710 and bit stream 1711, may be used and the processor 1436 generates all 128 scrambled bit streams, one for each correlator.

As will be appreciated by one of skill in the art, the method of using parallel correlation where all 128 bit streams are matched at one time, or serial correlation where each of the 128 bit streams is matched in turn, is known in the art. The maximum correlation 1720 for each of the seeds may be outputted and if a set of parallel correlators is used, the largest correlation would be selected. If a serial correlation scheme is used, the largest correlation after all 128 seeds have been used may be selected or, if, for any seed, a correlation exceeds the set correlation threshold, as discussed above with reference to FIGS. 12 and 13, a match may be declared and the rest of the seeds may not be produced.

Figure 18:
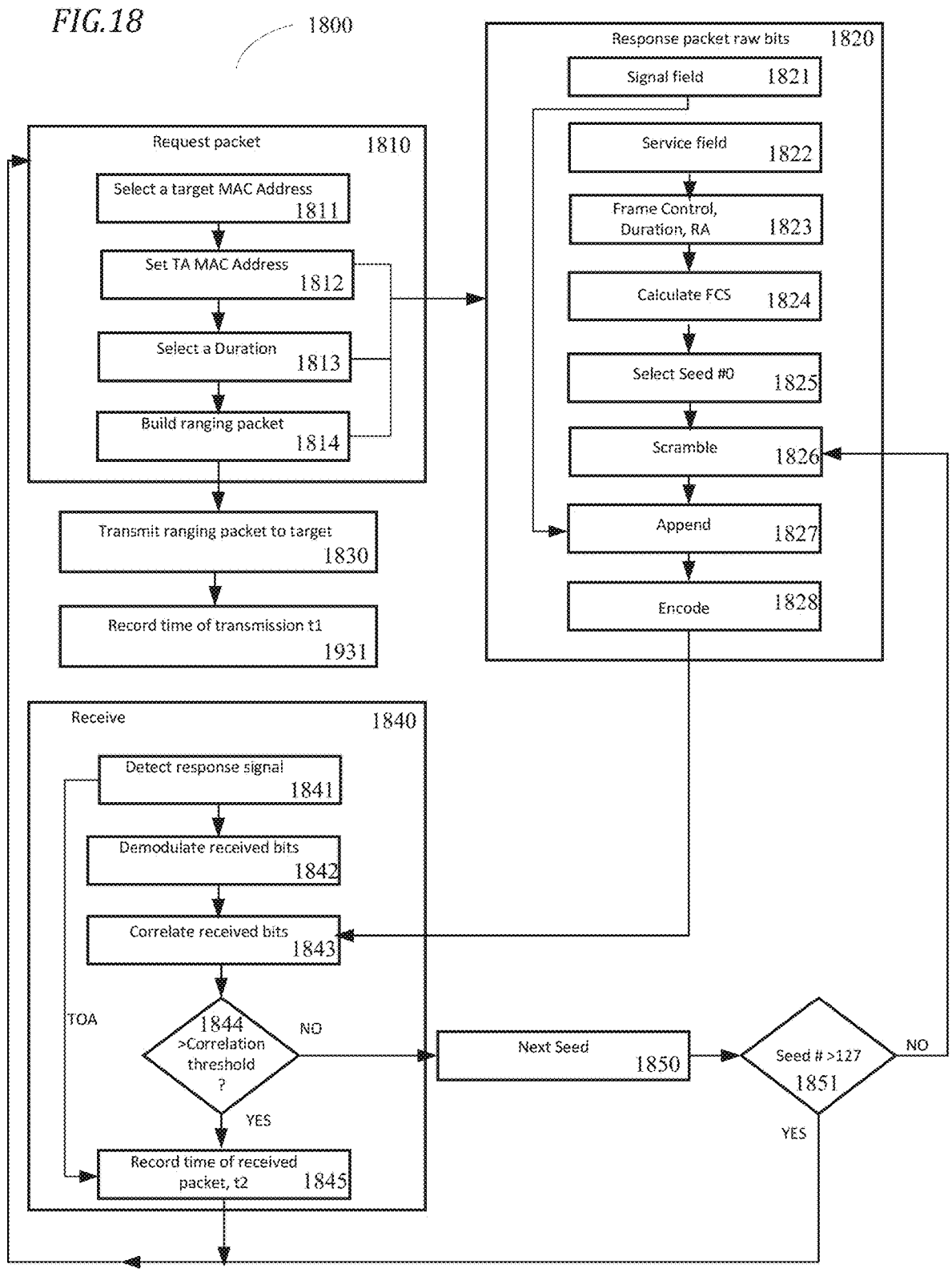
FIG. 18 is a flow diagram of process of an example of an embodiment of the disclosure that correlates the received raw coded and scrambled bits of the response packet with each of the 128 possible descrambled bit streams.

FIG. 18 is a flow diagram of process 1800 of an example of an embodiment of the disclosure that correlates the received raw coded and scrambled bits of the response packet 324 with each of the 128 possible descrambled bit streams. The process 1800 may include step 1810, which may be similar to step 1610 in FIG. 16, where the ranging packet 312 is constructed. The ranging packet 212 may be constructed by the processing circuitry 1412 based upon input from the general purpose processor 1480. Step 1810 may include and start with step 1811 where the MAC address of the target station 120 is selected. This selection may be based upon an input from the general purpose processor 1480 and performed by the processing circuitry 1435. Step 1810 may include and step 1811 may be followed by step 1812 where the MAC address to be used in the ranging packet 312 is set. In the ranging packet 312, which may be an RTS or a data null, this MAC address will be the TA Address. The selection of the TA may be based upon an input from the general purpose processor 1480 and performed by the processing circuitry 1435. In the corresponding response packet 324, this MAC address will be the RA 843. Step 1810 may include and step 1812 may be followed by step 1813 where a duration value is selected for the MAC header of the ranging packet 312. This effectively sets the value of the duration field 842 expected in the response packet 324. The selection of the duration value may be based upon an input from the general purpose processor 1480 and performed by the processor 1436. Step 1910 may include and step 1813 may be followed by step 1814 where the MAC header and payload for the ranging packet 312 is constructed. Step 1810 may be followed by step 1830 where the ranging packet 312 may be transmitted. Step 1830 may include taking the MAC Header and payload constructed in step 1814, adding the preamble and header, and then scrambling, encoding and modulating the bits as described in the IEEE 802.11 Standard and as discussed in reference to FIG. 8. The process of taking the MAC Header and payload constructed in step 1814, adding the preamble and header, and then scrambling, encoding and modulating the bits may be performed by the processing circuitry 1412 in the wireless transmitter 1410. Step 1830 may be followed by step 1831 where the time t1 of transmission of the ranging packet 312 is recorded. The recoding of the time t1 of transmission of the ranging packet 312 may be performed by the wireless receiver 1420.

The process 1800 may include step 1820 where the expected raw bits for the response packet 224 are determined. The determination of these raw bits may be performed by the processing circuitry 1435 and may be based upon inputs from the general purpose processor 1489 and/or the processing circuitry 1412. Step 1820 may include and start with step 1821 where the 24 raw bits of the signal field 820 (rate, length and parity) are set. Step 1820 may include and step 1821 may be followed by step 1822 where the service field may be constructed by block 1541 part of the processing circuitry 1435. Step 1820 may include and step 1822 may be followed by step 1823 where the frame control, duration and RA fields are constructed. The frame control field 841 will be set to correspond to the type of response packet 324 that is expected, e.g. CTS or ACK. The duration field 842 will correspond to the duration set in the request packet at step 1813. The RA field 843 will correspond to the TA MAC address set in step 1812. Step 1820 may include and step 1823 may be followed by step 1824 where the 32 bit FCS field 844 is calculated over the frame control, duration, and RA fields. Step 1820 may include and step 1824 may be followed by step 1825 where the initial scrambler seed may be selected. The IEEE 802.11 Standard specifies that the scrambler is initiated with a pseudorandom nonzero seed, hence the initial scrambler seed that may be selected may be, for example, 0000001 binary. Step 1820 may include and step 1825 may be followed by step 1826 where the service 830 and payload 820 fields are scrambled using the scrambler seed selected in step 1825. Step 1820 may include and step 1826 may be followed by step 1827 where the signal field from step 1821 is appended to the scrambled service and payload fields from step 1927 forming a 152 bit sequence. Step 1820 may include and step 1827 may be followed by step 1828 where the 152 bit sequence formed in step 1827 is encoded to create the 304 bit sequence that corresponds to the expected received packet 324 assuming it was scrambled using the seed selected in step 1825.

The process 1800 may include step 1840 where it is determined if a response packet 324 is received. The response packet may be received by wireless receiver 1430. Step 1840 may include and start with step 1841 where the incoming received signal is detected, as discussed above with reference to FIG. 7. The incoming signal may be detected by the branched preamble detector 700. If an incoming packet preamble is detected then the time of arrival TOA is outputted. Step 1840 may include and step 1841 may be followed by step 1842 where the detected packet is demodulated. The demodulation may be performed by demodulator 1432. The first 304 demodulated bits may represent the expected raw bits of the response packet 342. Step 1840 may include and step 1842 may be followed by step 1842 where, as discussed above with reference to FIGS. 12 and 13, the 304 bits of the detected and demodulated response signal may be correlated against the 304 bit stream obtained from step 1828. This correlation may be performed by correlator 1433. Step 1840 may include and step 1843 may be followed by step 1844 where it is determined if the correlation threshold resulting from the correlation process performed in step 1843 and as discussed above with reference to FIGS. 12 and 13, has been exceeded, indicating that it is probable that the expected response packet 224 has indeed been received. The determination of the threshold may be performed by the processing circuitry 1435 based upon the maximum correlation 1720. If it is determined that the threshold has been exceeded, then step 1840 may include and step 1844 may be followed by step 1845 where the time t2 of the received packet is recorded. This time t2 may be the TOA that is outputted by step 1941. The time t2 may be determined by the processing circuitry 1435 and may include input from the time clock 1460. The calculation of the distance from the measuring station 110 to the target station 120 is as described above in equations (2) and (4) where t1=T1 and t2=T4. The calculation of the distance may be performed by the processing circuitry 1435 and/or the general purpose processor 1480. The process may then return to step 1810 where the same or another ranging request packet 312 is constructed.

If at step 1844 it is determined that the correlation threshold has not been exceeded then Step 1844 step 1844 may be followed by step 1850 where another scrambler seed is selected. The selection of the next scrambler seed may be a simple increment from the previous. The selection of scrambler seeds may be performed by the processing circuitry 1435. Step 1844 may include a timeout such that if the correlation threshold has not been exceeded in a certain time then it is determined that the correlation threshold has not been exceeded. Step 1850 may be followed by step 1851 where it is checked if all the 128 scrambler seeds have been used. If not, then step 1851 may be followed by step 1826 where the service 830 and payload 820 fields are scrambled using the scrambler seed selected in step 1850. If at step 1951 it is determined that all 128 scrambler seeds have been used, then the process may then return to step 1830 where either the same or another ranging request packet 312 is constructed.

Figure 19:
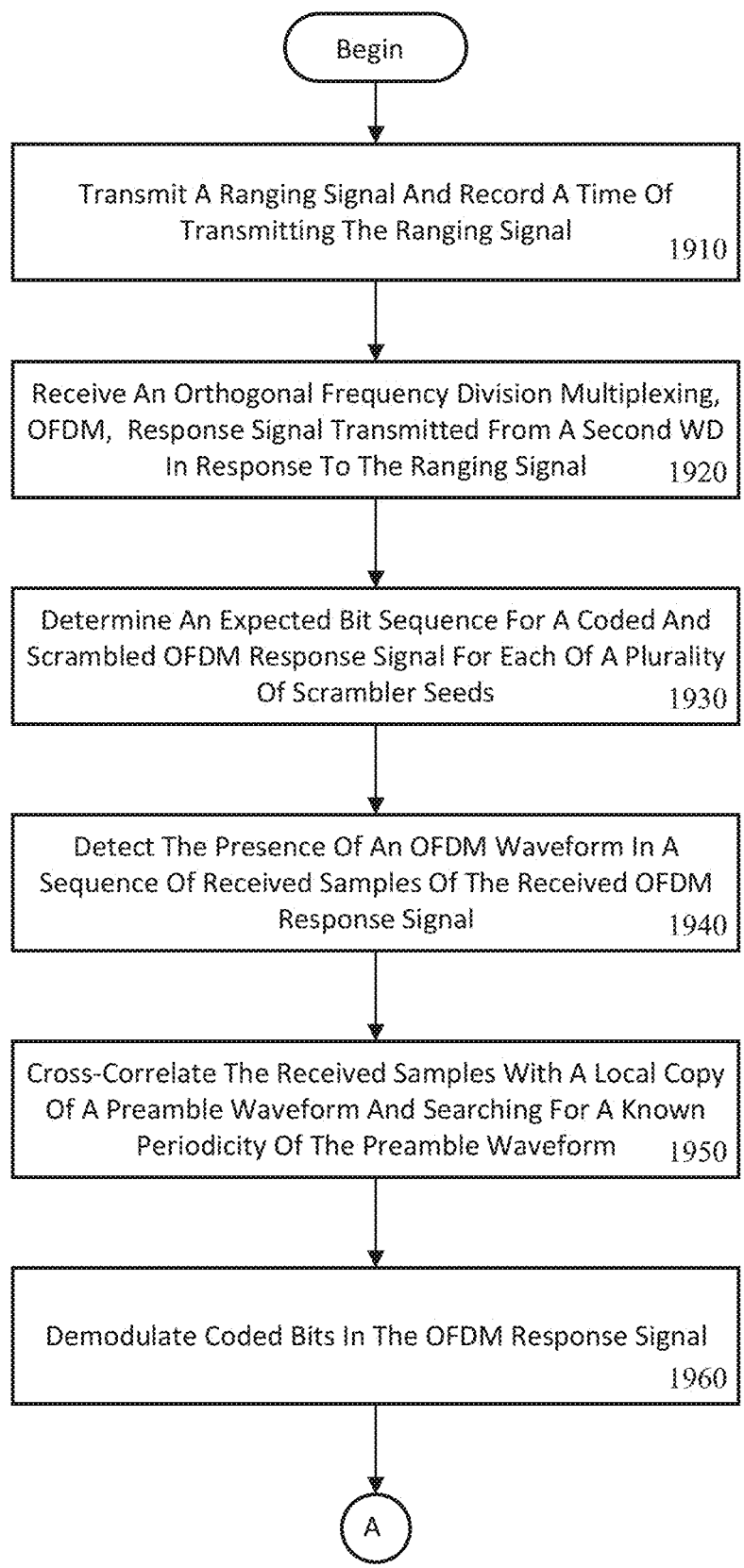
FIG. 19 is a first part of a flowchart of an exemplary process in a first WD in accordance with principles set forth below.
Figure 20:
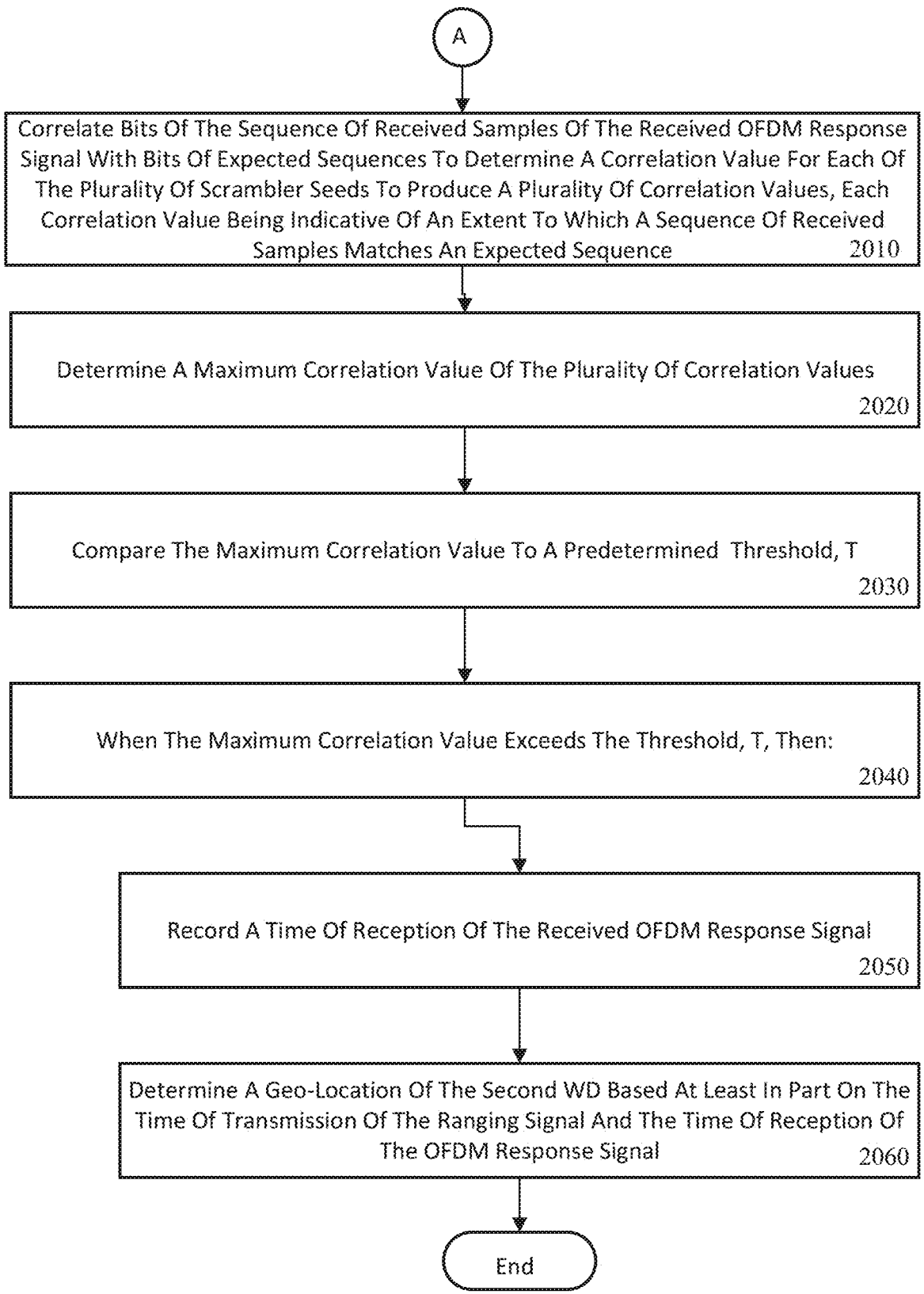
FIG. 20 is the second part of the flowchart of FIG. 19.

FIGS. 19 and 20 together are a flow diagram of a process of an example of an embodiment of the disclosure that correlates the received coded and scrambled bits of the response packet 324 with each of the 128 possible descrambled bit streams. The process may include step 1910 which includes transmitting, via RF transmitter 1411, a ranging signal and recording a time of transmitting the ranging signal. The process may also include step 1920 which includes receiving, via RF receiver 1422, an orthogonal frequency division multiplexing, OFDM, response signal transmitted from a second WD in response to the ranging signal. The process may also include step 1930 which includes determining, via the processing circuitry 1412 and/or 1425, an expected bit sequence for a coded and scrambled OFDM response signal for each of a plurality of scrambler seeds. The process may also include step 1940 which includes detecting the presence of an OFDM waveform in a sequence of received samples of the received OFDM response signal. The process may also include step 1950 which includes cross-correlating, via the processing circuitry 142, the received samples with a local copy of a preamble waveform and searching for a known periodicity of the preamble waveform. The process may also include step 1960 which includes demodulating, via the RF receiver 1422, coded bits in the OFDM response signal.

Continuing to FIG. 20, the process may also include step 2010 which includes correlating, via the processing circuitry 1435, bits of the sequence of received samples of the received OFDM response signal with bits of expected sequences to determine a correlation value for each of the plurality of scrambler seeds to produce a plurality of correlation values, each correlation value being indicative of an extent to which a sequence of received samples matches an expected sequence. The process may also include step 2020 which includes determining, via processing circuitry 1435, a maximum correlation value of the plurality of correlation values. The process may also include step 2030 which includes comparing, via the processing circuitry 1435, the maximum correlation value to a predetermined threshold, T. When the maximum correlation value exceeds the threshold, T (step 2040), then the process may also include step 2050 which includes recording, via processing circuitry 1425 and/or 1435, a time of reception of the received OFDM response signal, and may also include step 2060 which includes determining, via the processing circuitry 1435, a geo-location of the second WD based at least in part on the time of transmission of the ranging signal and the time of reception of the OFDM response signal.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the correlation threshold value(s), the duration field value(s), the MAC address used in the ranging packet, the timing of the ranging packets, the timeout used for a response packet, the use of parallel or serial correlation, the number of frequency shifters in the preamble detector, the order of construction of the expected response packet, the use of parallel or serial correlators. Accordingly the scope should be determined not by the embodiments illustrated, but by the claims and their legal equivalents.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a first wireless device (WD), the method comprising:
  transmitting a ranging signal and recording a time of transmitting the ranging signal;
  receiving an orthogonal frequency division multiplexing (OFDM) response signal transmitted from a second WD in response to the ranging signal;
  determining an expected bit sequence for a coded and scrambled OFDM response signal for each of a plurality of scrambler seeds;
  detecting the presence of an OFDM waveform in a sequence of received samples of the received OFDM response signal;
  cross-correlating the received samples with a local copy of a preamble waveform and searching for a known periodicity of the preamble waveform;
  demodulating coded bits in the OFDM response signal;
  correlating bits of the sequence of received samples of the received OFDM response signal with bits of expected sequences to determine a correlation value for each of the plurality of scrambler seeds to produce a plurality of correlation values, each correlation value being indicative of an extent to which a sequence of received samples matches an expected sequence;
  determining a maximum correlation value of the plurality of correlation values;
  comparing the maximum correlation value to a predetermined threshold, T; and
  when the maximum correlation value exceeds the threshold, T, then:
    recording a time of reception of the received OFDM response signal; and
    determining a geo-location of the second WD based at least in part on the time of transmission of the ranging signal and the time of reception of the OFDM response signal.

2. The method of claim 1, wherein the transmitted ranging signal is one of a request-to-send (RTS) signal and a data null signal.

3. The method of claim 1, further comprising:
  using a branched preamble detector and using multiple cross correlators in parallel branches, each cross correlator tuned to a different carrier frequency offset (CFO) to produce the plurality of correlation values, each CFO being within a range of offsets permitted by an IEEE 802.11 Standard;
  determining the branch that produces a largest correlation; and
  estimating the CFO based upon the branch that produces the largest correlation.

4. The method of claim 1, further comprising determining parameters of the ranging signal by at least one of:
  selecting a WD receiver address (RA) to be used as a medium access control (MAC) address of the second WD;
  selecting a MAC address to be used as a wireless transmitter address (TA); and
  selecting a duration value.

5. The method of claim 1, wherein a determination of the bits of the expected sequence includes:
  constructing 24 bits of the signal field, the signal field including rate, length and parity;
  constructing 16 bits of a service field;
  constructing frame control, duration and RA fields;
  calculating a 32 bit frame check sequence (FCS) field;
  constructing the payload by appending the FCS field to the frame control, duration and RA fields; and
  then, for each of the plurality of scrambler seeds:
    scrambling the service and payload fields using the scrambler seed;
    appending the signal field to the scrambled service and payload fields to form a 152 bit sequence; and
    encoding the signal field and the scrambled service and payload fields to form a 304 bit sequence.

6. The method of claim 1, wherein the threshold, T, depends at least in part on a bit error probability, Pb, the bit error probability, Pb, being based on a signal to noise ratio (SNR).

7. The method of claim 6, wherein the threshold, T, in percent is given by $$T=100-(1-2Pb).$$

8. The method of claim 1, further comprising receiving a subsequent spread spectrum signal when the threshold, T, is not exceeded for a predetermined time.

9. A first wireless device (WD), comprising:
  a transceiver configured to:
    transmit a ranging signal; and
    receive an orthogonal frequency division multiplexing (OFDM) response signal transmitted from a second WD in response to the ranging signal; and
  processing circuitry in communication with the transceiver, the processing circuitry configured to:
    record a time of transmitting the ranging signal
    determine an expected bit sequence for a coded and scrambled OFDM response signal for each of a plurality of scrambler seeds;
    detect the presence of an OFDM waveform in a sequence of received samples of the received OFDM response signal;
    cross-correlate the received samples with a local copy of a preamble waveform and searching for a known periodicity of the preamble waveform;
    demodulate coded bits in the OFDM response signal;
    correlate bits of the sequence of received samples of the received OFDM response signal with bits of expected sequences to determine a correlation value for each of the plurality of scrambler seeds to produce a plurality of correlation values, each correlation value being indicative of an extent to which a sequence of received samples matches an expected sequence;
    determine a maximum correlation value of the plurality of correlation values;
    compare the maximum correlation value to a predetermined threshold, T; and
    when the maximum correlation value exceeds the threshold, T, then:
      record a time of reception of the received OFDM response signal; and
      determine a geo-location of the second WD based at least in part on the time of transmission of the ranging signal and the time of reception of the OFDM response signal.

10. The first wireless device of claim 9, wherein the transmitted ranging signal is one of a request-to-send, RTS, signal and a data null signal.

11. The first wireless device of claim 9, wherein the processing circuitry is further configured to:
    use multiple cross correlators in parallel branches, each cross correlator tuned to a different carrier frequency offset (CFO) to produce the plurality of correlation values, each CFO being within a range of offsets permitted by an IEEE 802.11 Standard;
    determine the branch that produces a largest correlation; and
    estimate the CFO based upon the branch that produces the largest correlation.

12. The first wireless device of claim 9, wherein the processing circuitry is further configured to determine parameters of the ranging signal by at least one of:
    selecting a WD receiver address, RA, to be used as a medium access control (MAC) address of the second WD;
    selecting a MAC address to be used as a wireless transmitter address (TA); and
    selecting a duration value.

13. The first wireless device of claim 9, wherein a determination of the bits of the expected sequence includes:
    constructing 24 bits of the signal field, the signal field including rate, length and parity;
    constructing 16 bits of a service field;
    constructing frame control, duration and RA fields;
    calculating a 32 bit frame check sequence (FCS) field;
    constructing the payload by appending the FCS field to the frame control, duration and RA fields; and
    then, for each of the plurality of scrambler seeds:
        scrambling the service and payload fields using the scrambler seed;
        appending the signal field to the scrambled service and payload fields to form a 152 bit sequence; and
        encoding the signal field and the scrambled service and payload fields to form a 304 bit sequence.

14. The first wireless device of claim 9, wherein the threshold, T, depends at least in part on a bit error probability, Pb, the bit error probability, Pb, being based on a signal to noise ratio (SNR).

15. The first wireless device of claim 14, wherein the threshold, T, in percent is given by T=100 (1−2 Pb).

16. The first wireless device of claim 9, wherein the transceiver is further configured to receive a subsequent spread spectrum signal when the threshold, T, is not exceeded for a predetermined time.

17. A first wireless (WD) device for determining a geo-location of a second WD, the first WD comprising:
    a transceiver configured to:
        transmit a ranging signal; and
        receive an orthogonal frequency division multiplexing (OFDM) response signal transmitted from a second WD in response to the ranging signal and record a time of reception of the received OFDM response signal; and
    processing circuitry in communication with the transceiver, the processing circuitry configured to:
        record a time of transmitting the ranging signal;
        determine an expected sequence for a coded and scrambled signal field of the OFDM response signal for each of a plurality of possible scrambler seeds, one of which scrambles the signal field, to produce a plurality of expected sequences;
        detect the presence of an OFDM waveform in a sequence of received samples of the received OFDM response signal;
        cross-correlate the received samples with a local copy of a preamble waveform and search for a known periodicity of the preamble waveform;
        demodulate the coded bits in the OFDM response signal;
        correlate a received sequence of samples of the received OFDM response signal with the expected sequences to determine a correlation value for each of the plurality of scrambler seeds to produce a plurality of correlation values;
        determine a maximum correlation value among the plurality of correlation values;
        compare the maximum correlation value to a predetermined threshold, T; and
        when the maximum correlation value exceeds the threshold, T, determine a geo-location of the second WD based at least in part on the time of transmission of the ranging signal and the time of reception of the OFDM response signal.

18. The first wireless device of claim 17, wherein the threshold, T, depends at least in part on a bit error probability, Pb.

19. The first wireless device of claim 18, wherein the bit error probability, Pb, is based on a signal to noise ratio (SNR).

20. The first wireless device of claim 17, wherein the processing circuitry is further configured to receive a subsequent spread spectrum signal when the threshold, T, is not exceeded for a predetermined time.

* * * * *